United States Patent
Han et al.

(10) Patent No.: US 11,256,614 B2
(45) Date of Patent: Feb. 22, 2022

(54) MEMORY CONTROLLER FOR ALLOCATING LOGICAL ADDRESS AND METHOD OF OPERATING THE SAME

(71) Applicant: SK hynix Inc., Gyeonggi-do (KR)

(72) Inventors: Seung Ok Han, Gyeonggi-do (KR); Seung Wan Jung, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 120 days.

(21) Appl. No.: 16/592,235

(22) Filed: Oct. 3, 2019

(65) Prior Publication Data
US 2020/0310958 A1    Oct. 1, 2020

(30) Foreign Application Priority Data
Mar. 27, 2019    (KR) .................. 10-2019-0035387

(51) Int. Cl.
G06F 12/02    (2006.01)
G06F 9/30    (2018.01)
G06F 13/16    (2006.01)

(52) U.S. Cl.
CPC ........ G06F 12/0246 (2013.01); G06F 9/3009 (2013.01); G06F 12/0253 (2013.01); G06F 13/1668 (2013.01); *G06F 2212/7201* (2013.01)

(58) Field of Classification Search
CPC .............. G06F 9/3009; G06F 12/0246; G06F 12/0253; G06F 13/1668; G06F 2212/7201; G06F 2212/7205
See application file for complete search history.

(56) References Cited

U.S. PATENT DOCUMENTS

| | | | | |
|---|---|---|---|---|
| 5,551,003 A * | 8/1996 | Mattson | ................ | G06F 3/0601 711/112 |
| 8,886,877 B1 * | 11/2014 | Avila | .................. | G06F 12/0638 711/103 |
| 2005/0015567 A1 * | 1/2005 | Zohar | ................. | G06F 12/0873 711/203 |
| 2011/0307544 A1 * | 12/2011 | Lotlikar | .................. | G06F 9/468 709/203 |
| 2017/0168930 A1 * | 6/2017 | Choi | ..................... | G06F 3/0613 |

FOREIGN PATENT DOCUMENTS

| | | |
|---|---|---|
| KR | 10-2013-0116110 | 10/2013 |
| KR | 10-2017-0009000 | 1/2017 |
| KR | 10-2018-0049148 | 5/2018 |

* cited by examiner

*Primary Examiner* — Larry T Mackall
(74) *Attorney, Agent, or Firm* — IP & T Group LLP

(57) ABSTRACT

Provided herein may be a memory controller and a method of operating the same. The memory controller for controlling a plurality of memory devices in which data is stored may include a host interface configured to receive a request and a logical address corresponding to the request from a host, a processor including multiple cores, each configured to receive the logical address from the host interface and generate mapping information indicating a mapping relationship between the logical address and a physical address and a bitmap storage configured to store a bitmap indicating which core of the multiple cores each of previously-received logical addresses is assigned, wherein the host interface assigns the logical address to one of the multiple cores based on the bitmap.

17 Claims, 22 Drawing Sheets

FIG. 6

| LOGICAL BLOCK ADDRESS(LBA) | LBA0 | LBA1 | LBA2 | LBA3 | LBA4 | LBA5 | LBA6 | LBA7 | LBA8 | LBA9 |
|---|---|---|---|---|---|---|---|---|---|---|
| BITMAP (Bitmap) | - | 0 | 1 | 1 | - | 0 | 0 | 1 | - | - |

FIG. 9

| LOGICAL BLOCK ADDRESS(LBA) | LBA0 | LBA1 | LBA2 | LBA3 | LBA4 | LBA5 | LBA6 | LBA7 | LBA8 | LBA9 |
|---|---|---|---|---|---|---|---|---|---|---|
| BITMAP (Bitmap) | - | 11 | 01 | 01 | - | 00 | 00 | 10 | - | - |

| LOGICAL BLOCK ADDRESS(LBA) | LBA0 | LBA1 | LBA2 | LBA3 | LBA4 | LBA5 | LBA6 | LBA7 | LBA8 | LBA9 |
|---|---|---|---|---|---|---|---|---|---|---|
| BITMAP (Bitmap) | - | - | - | - | 1 | - | - | - | 1 | - |

| LOGICAL BLOCK ADDRESS(LBA) | LBA0 | LBA1 | LBA2 | LBA3 | LBA4 | LBA5 | LBA6 | LBA7 | LBA8 | LBA9 |
|---|---|---|---|---|---|---|---|---|---|---|
| BITMAP (Bitmap) | - | - | - | - | 1 | - | - | - | - | - |

FIG. 15A

| LOGICAL BLOCK ADDRESS(LBA) | LBA0 | LBA1 | LBA2 | LBA3 | LBA4 | LBA5 | LBA6 | LBA7 | LBA8 | LBA9 |
|---|---|---|---|---|---|---|---|---|---|---|
| BITMAP (Bitmap) | - | 0 | 1 | 1 | - | 0 | 0 | 1 | - | - |

FIG. 15B

| LOGICAL BLOCK ADDRESS(LBA) | LBA0 | LBA1 | LBA2 | LBA3 | LBA4 | LBA5 | LBA6 | LBA7 | LBA8 | LBA9 |
|---|---|---|---|---|---|---|---|---|---|---|
| BITMAP (Bitmap) | - | 0 | 0 | 0 | - | 0 | 0 | 1 | - | - |

MEMORY CONTROLLER FOR ALLOCATING LOGICAL ADDRESS AND METHOD OF OPERATING THE SAME

CROSS-REFERENCE TO RELATED APPLICATION

The present application claims priority under 35 U.S.C. § 119(a) to Korean patent application number 10-2019-0035387, filed on Mar. 27, 2019, which is incorporated herein by reference in its entirety.

BACKGROUND

Field of Invention

Various embodiments of the present disclosure generally relate to an electronic device, and more particularly, to a memory controller and a method of operating the memory controller.

Description of Related Art

A storage device stores data under the control of a host such as a computer, a smartphone, or a smartpad. Examples of the storage device include a hard disk drive (HDD) which stores data in a magnetic disk, a solid state drive (SSD) and a memory card which stores data in a semiconductor memory, particularly, a nonvolatile memory, according to the device in which data is stored.

The storage device may include a memory device in which data is stored and a memory controller which controls storage of data in the memory device. Such memory devices may be classified into a volatile memory and a nonvolatile memory. Representative examples of the nonvolatile memory include a read only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (RRAM), and a ferroelectric RAM (FRAM).

SUMMARY

Various embodiments of the present disclosure are directed to a memory controller that more evenly or equally assigns or distributes workloads to plural memory devices and a method of operating the memory controller.

An embodiment of the present disclosure may provide for a memory controller for controlling a plurality of memory devices in which data is stored. The memory controller may include a host interface configured to receive a request and a logical address corresponding to the request from a host, a processor including multiple cores, each configured to receive the logical address from the host interface and generate mapping information indicating a mapping relationship between the logical address and a physical address and a bitmap storage configured to store a bitmap indicating which core of the multiple cores each of previously-received logical addresses is assigned, wherein the host interface assigns the logical address to one of the multiple cores based on the bitmap.

An embodiment of the present disclosure may provide for a method of operating a memory controller, the memory controller including multiple cores for controlling a plurality of memory devices in which data is stored. The method may include receiving a request and a logical address corresponding to the request from a host, referring to a bitmap indicating which core of the multiple cores each of previously-received logical addresses is assigned and assigning the received logical address to one of the multiple cores based on the bitmap.

An embodiment of the present disclosure may provide for a method of operating a memory controller, the memory controller including multiple cores for controlling a plurality of memory devices in which data is stored. The method may include determining a victim memory block on which garbage collection is to be performed, among a plurality of memory blocks included in the plurality of memory devices, referring to a bitmap indicating which core of the multiple cores each of previously-received logical addresses is assigned and assigning logical addresses respectively corresponding to physical addresses of the victim memory block among the multiple cores based on the bitmap.

An embodiment of the present disclosure may provide for a controller. The memory controller may include plural cores each configured to control a corresponding memory device group to perform an operation based on one or more logical addresses assigned thereto, a storage configured to store assignment status information indicating numbers of logical addresses assigned to the respective cores and an assignment module configured to control assignment of the logical addresses such that the numbers of logical addresses assigned to the respective cores converge on an assignment ratio by sequentially assigning logical addresses to the cores based on the assignment status information.

BRIEF DESCRIPTION OF THE DRAWINGS

FIG. 6 is a diagram illustrating a bitmap indicating cores to which logical block addresses are assigned.

FIG. 9 is a diagram illustrating a bitmap indicating cores to which logical block addresses are assigned when there are four cores.

FIGS. 15A and 15B are diagrams illustrating a bitmap stored in a bitmap storage before garbage collection is performed and after garbage collection has been performed, respectively.

DETAILED DESCRIPTION

Figure 1:
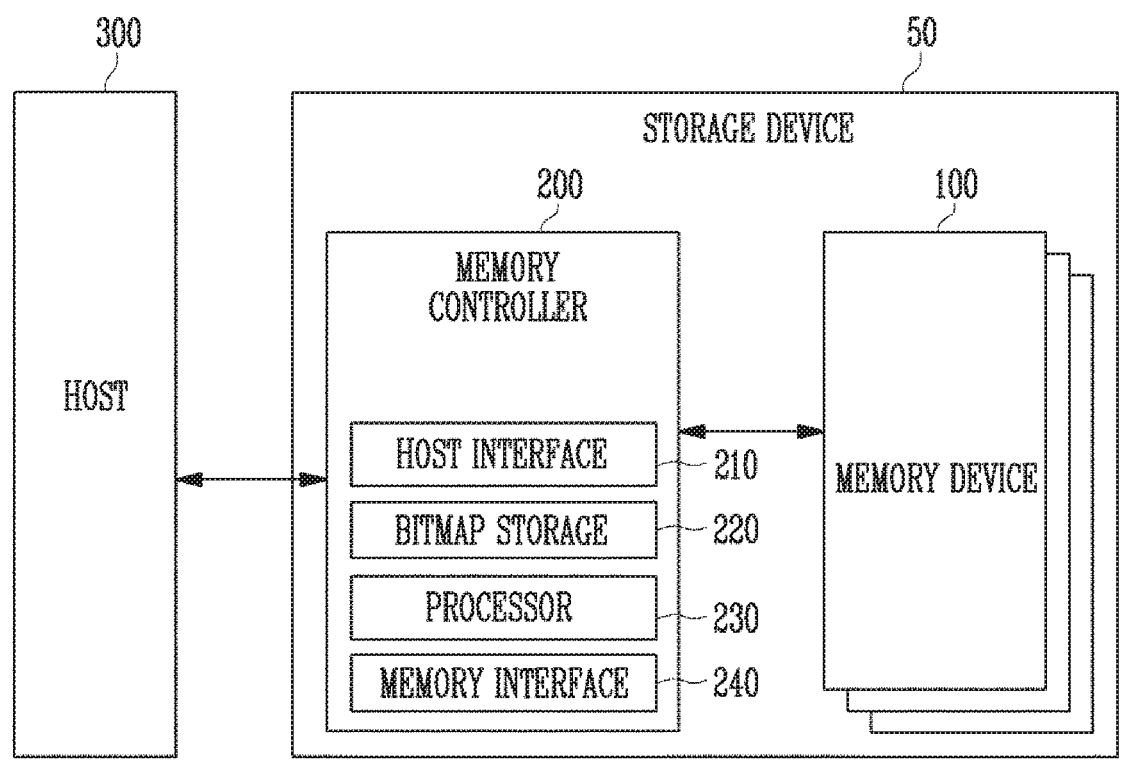
FIG. 1 is a block diagram illustrating a storage device.

Specific structural and functional description presented herein is to describe various embodiments of the present disclosure to enable those skilled in the art to practice the present invention. The present invention, however, is not limited by such description.

The present invention is described in detail below based on embodiments. The present invention may, however, be embodied in many different forms and thus should not be construed as being limited to only the embodiments set forth herein. Rather, the present invention should be construed as covering all modifications, equivalents and alternatives falling within the spirit and technical scope of the present disclosure.

It will be understood that, although the terms "first" and/or "second" may be used herein to identify various elements, these elements should not be limited by these terms. These terms are only used to distinguish one element from another element that otherwise have the same or similar names. For example, a first element in one instance could be termed a second element in another instance, and vice versa, without departing from the teachings of the present disclosure.

It will be understood that when an element is referred to as being "coupled" or "connected" to another element, it can be directly coupled or connected to the other element or one or more intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to" or "directly adjacent to" should be construed in the same way.

The terminology used herein is for the purpose of describing particular embodiments only and is not intended to be limiting. In the present disclosure, the singular forms are intended to include the plural forms and vice versa, unless the context clearly indicates otherwise. It will be further understood that the terms "comprise", "include", "have", as well as other open-ended terms, when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and not be interpreted in an idealized or overly formal sense unless expressly so defined herein.

Detailed description of functions and structures well known to those skilled in the art are omitted to avoid obscuring the subject matter of the present disclosure. This aims to omit unnecessary description so as to make the subject matter of the present disclosure clear.

Various embodiments of the present disclosure are described more fully below with reference to the accompanying drawings, in which preferred embodiments of the present disclosure are illustrated, so that those of ordinary skill in the art can easily practice the present invention.

FIG. 1 is a block diagram illustrating a storage device.

Referring to FIG. 1, a storage device 50 may include memory devices 100 and a memory controller 200.

The storage device 50 may store data under the control of a host 300, such as a mobile phone, a smartphone, an MP3 player, a laptop computer, a desktop computer, a game console, a television (TV), a tablet PC, or an in-vehicle infotainment system.

The storage device 50 may be configured as any one of various types of storage devices depending on a host interface that is a scheme for communication with the host 300. For example, the storage device 50 may be implemented as any one of various types of storage devices, for example, a solid state disk (SSD), a multimedia card such as an MMC, an embedded MMC (eMMC), a reduced size MMC (RS-MMC), or a micro-MMC, a secure digital card such as an SD, a mini-SD, or a micro-SD, a universal storage bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick.

The storage device 50 may be manufactured in any one of various types of package forms. For example, the storage device 50 may be manufactured in any one of various types of package forms, such as package on package (POP), system in package (SIP), system on chip (SOC), multi-chip package (MCP), chip on board (COB), wafer-level fabricated package (WFP), and wafer-level stack package (WSP).

The memory controller 200 may control the overall operation of the storage device 50.

When power is applied to the storage device 50, the memory controller 200 may run firmware (FW). When each memory device 100 is a flash memory device, the memory controller 200 may run firmware such as a Flash Translation Layer (FTL) for controlling communication between the host 300 and the memory device 100.

The memory controller 200 may control a plurality of memory devices. In order to control the plurality of memory devices, multiple cores may be included in the memory controller 200.

The memory controller 200 may include a host interface 210. The host interface 210 may receiver a request and a logical block address (LBA) from the host 300. The request received from the host 300 may be a write request WRITE_REQ or a read request READ_REQ. The logical block address (LBA) received from the host 300 may be an address corresponding to the write request WRITE_REQ or the read request READ_REQ. The logical block address (LBA) may be a logical address (LA) indicating a logical page.

After receiving the request and the logical block address corresponding to the request from the host 300, the host interface 210 may perform an operation corresponding to the request received from the host 300.

In an embodiment, the host interface 210 may output the logical block address received from the host 300 to a processor 230. The host interface 210 may receive a bitmap from a bitmap storage 220, and may determine a core to which the logical block address is to be assigned, among multiple cores included in the processor 230. That is, the host interface 210 may refer to the bitmap received from the bitmap storage 220 to correlate logical block address assignment with a particular core in the processor 230.

The host interface 210 may determine the core to which the logical block address is to be assigned based on the result of reference to the bitmap. That is, the host interface 210 may determine any one of the multiple cores to be the core to which the logical block address is to be assigned based on the bitmap.

An operation in which the host interface 210 assigns the logical block address received from the host 300 may include assigning the request corresponding to the logical block address to any one of the multiple cores included in the processor 230.

In detail, the host interface 210 may determine the core to which the logical block address received from the host 300 is to be assigned depending on the number of logical block addresses assigned to the multiple cores. When the core to which the logical block address is to be assigned is determined, the host interface 210 may output the logical block address to the determined core.

The memory controller 200 may include the bitmap storage 220. The bitmap storage 220 may store the bitmap. The bitmap may include bit values corresponding to logical block addresses. A bit value corresponding to each logical block address may indicate the core to which the corresponding logical block address has been assigned, among the multiple cores included in the processor 230. That is, the bitmap storage 220 may store the bit value indicating any one of the multiple cores.

In an embodiment, the bitmap storage 220 may receive core information CORE_INF from the host interface 210 and then change the bit value included in the bitmap. The core information CORE_INF may include information about the core to which the logical block address is to be assigned. The bitmap may indicate a state in which logical block addresses, received before the host interface 210 receives the corresponding logical block address from the host 300, are assigned to multiple cores.

The memory controller 200 may include the processor 230. The processor 230 may include at least one core. The core may control the memory devices 100. In an embodiment, when there are multiple cores, each of the multiple cores may control a plurality of memory devices.

The core included in the processor 230 may receive the logical block address from the host interface 210 and then generate mapping information indicating a mapping relationship between the logical block address (LBA) and a physical block address (PBA). After generating the mapping information, the processor 230 may output the physical block address (PBA) corresponding to the logical block address. The physical block address (PBA) may indicate the location of a memory block included in any one of a plurality of memory devices. That is, the physical block address (PBA) may be a physical address (PA) indicating a physical page.

The memory controller 200 may include a memory interface 240. The memory interface 240 may receive the physical block address (PBA) from the processor 230. The memory interface 240 may output the received physical block address (PBA) to the corresponding memory device 100. The memory interface 240 may be coupled to the plurality of memory devices. Therefore, the memory interface 240 may output the physical block address (PBA) to the memory device 100 corresponding to the physical block address (PBA) received from the processor 230, among the plurality of memory devices.

The memory device 100 may store data. The memory device 100 is operated in response to the control of the memory controller 200. The memory device 100 may include a memory cell array including a plurality of memory cells which store data. The memory cell array may include a plurality of memory blocks. Each memory block may include a plurality of memory cells. A single memory block may include a plurality of pages. In an embodiment, a page may be a unit by which data is stored in the memory device 100 or by which data stored in the memory device 100 is read. A memory block may be a unit by which data is erased.

In an embodiment, the memory device 100 may take many alternative forms, such as a double data rate synchronous dynamic random access memory (DDR SDRAM), a low power double data rate fourth generation (LPDDR4) SDRAM, a graphics double data rate (GDDR) SDRAM, a Low Power DDR (LPDDR) SDRAM, a Rambus dynamic random access memory (RDRAM), a NAND flash memory, a vertical NAND flash memory, a NOR flash memory device, a resistive RAM (RRAM), a phase-change memory (PRAM), a magnetoresistive RAM (MRAM), a ferroelectric RAM (FRAM), or a spin transfer torque RAM (STT-RAM). In the present specification, by way of example, features and aspects of the present invention are described in the context in which the memory device 100 is a NAND flash memory.

In an embodiment, the memory device 100 may be implemented as a three-dimensional (3D) array structure. The present disclosure may also be applied not only to a flash memory device in which a charge storage layer is formed of a conductive floating gate (FG), but also to a charge trap flash (CTF) memory device in which a charge storage layer is formed of an insulating layer.

In an embodiment, each of the memory cells included in the memory device 100 may be implemented as a Single-Level Cell (SLC) in which one data bit is stored. Alternatively, each of the memory cells included in the memory device 100 may be implemented as a Multi-level Cell (MLC) in which two data bits are stored, a Triple-Level Cell (TLC) in which three data bits are stored, or a Quad-Level Cell (QLC) in which four data bits are stored.

The memory device 100 may receive a command and an address from the memory controller 200, and may access the area of the memory cell array, selected by the address. That is, the memory device 100 performs an operation corresponding to the command on the area selected by the address. For example, the memory device 100 may perform a write operation (i.e., program operation), a read operation, and an erase operation. During a program operation, the memory device 100 may program data to the area selected by the address. During a read operation, the memory device 100 may read data from the area selected by the address. During an erase operation, the memory device 100 may erase data stored in the area selected by the address.

The memory device 100 may perform a program operation or an erase operation using a set operating voltage under the control of the memory controller 200.

In an embodiment, the memory controller 200 may receive data and a logical block address (LBA) from the host 300, and may translate the logical block address (LBA) into a physical block address (PBA) indicating the address of memory cells which are included in the memory device 100 and in which data is to be stored. Further, the memory controller 200 may store mapping information, which establishes mapping relationships between logical block addresses (LBA) and physical block addresses (PBA), in the buffer memory.

The memory controller 200 may control the memory device 100 so that a program operation, a read operation or an erase operation is performed in response to a request received from the host 300. During a program operation, the memory controller 200 may provide a program command, a physical block address (PBA), and data to the memory device 100. During a read operation, the memory controller 200 may provide a read command and a physical block address (PBA) to the memory device 100. During an erase operation, the memory controller 200 may provide an erase command and a physical block address (PBA) to the memory device 100.

In an embodiment, the memory controller 200 may autonomously generate a program command, an address, and data without receiving a request from the host 300, and may transmit the generated program command, address, and data to the memory device 100. For example, the memory controller 200 may provide commands, addresses, and data to the memory device 100 so as to perform background operations, such as a program operation for wear leveling and a program operation for garbage collection.

In an embodiment, the memory controller 200 may control at least two memory devices. In this case, the memory controller 200 may control the memory devices using an interleaving scheme to improve operating performance.

The host 300 may communicate with the storage device 50 using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

Figure 2:
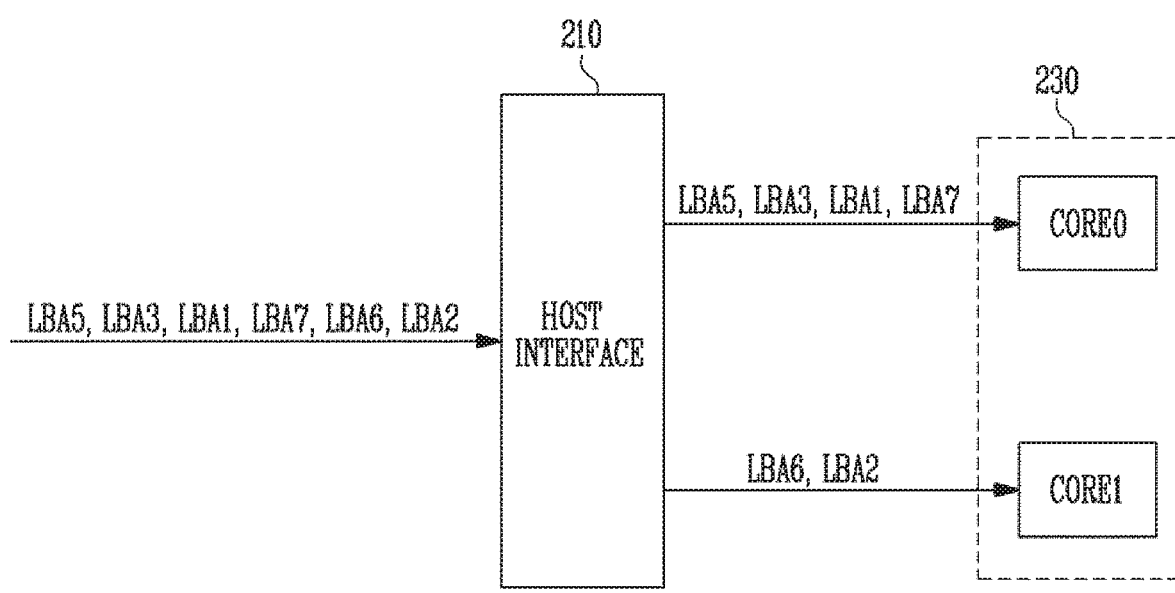
FIG. 2 is a diagram illustrating a conventional method of allocating logical block addresses to multiple cores.

FIG. 2 is a diagram illustrating a conventional method of assigning logical block addresses to multiple cores.

Referring to FIG. 2, a host interface 210 may sequentially receive a fifth logical block address (LBA5), a third logical block address (LBA3), a first logical block address (LBA1), a seventh logical block address (LBA7), a sixth logical block address (LBA6), and a second logical block address (LBA2) from a host 300. The host interface 210 may output the received logical block addresses to the processor 230. Such a logical block address (LBA) may be a logical address (LA) indicating a logical page.

The sixth logical block address (LBA6) and the second logical block address (LBA2) may be even addresses (even LBA). The fifth logical block address (LBA5), the third logical block address (LBA3), the first logical block address (LBA1), and the seventh logical block address (LBA7) may be odd addresses (Odd LBA). That is, depending on whether the number of each logical block address is even or odd, the corresponding logical block address may be an even address (Even LBA) or an odd address (Odd LBA).

In conventional technology, the host interface 210 assigns the logical block address to any one of the cores included in the processor 230 depending on whether the logical block address is an even address (Even LBA) or an odd address (Odd LBA). In detail, since the fifth logical block address (LBA5), the third logical block address (LBA3), the first logical block address (LBA1), and the seventh logical block address (LBA7) are odd addresses (Odd LBA), the host interface 210 assigns the fifth logical block address (LBA5), the third logical block address (LBA3), the first logical block address (LBA1), and the seventh logical block address (LBA7) to a 0-th core CORE0 corresponding to the odd addresses (Odd LBA). Also, since the sixth logical block address (LBA6) and the second logical block address (LBA2) are even addresses (Even LBA), the host interface 210 assigns the sixth logical block address (LBA6) and the second logical block address (LBA2) to a first core CORE1 corresponding to the even addresses (Even LBA). When the logical block addresses are received from the host interface 210, the processor 230 generates mapping information indicating mapping relationships between the logical block addresses and physical block addresses (PBA).

However, the conventional method of assigning logical block addresses to cores is problematic in that it depends on the number of each logical block address. That is, when only an even address (Even LBA) or an odd address (Odd LBA) is received from the host 300, a problem arises in that mapping information is generated only in one core. Therefore, there is a problem in that only one core performs an operation, and thus the amount of use of memory devices that are managed by the one core increases.

In an embodiment, since the number of odd addresses (Odd LBA), among the logical block addresses received from the host 300, is large, a problem may arise in that the amount of use of memory devices that are managed by the 0-th core CORE0 increases.

Also, when concentrating generation of mapping information in only one core among the multiple cores, the number of program cycles and erase cycles of memory devices associated with the one core may increase, thus deteriorating the overall performance of the memory devices. That is, according to the conventional method, it is impossible to equally or evenly assign logical block addresses to the multiple cores, thus deteriorating the performance of the memory devices.

Therefore, there is a need to evenly assign or equally distribute logical block addresses to multiple cores.

Figure 3:
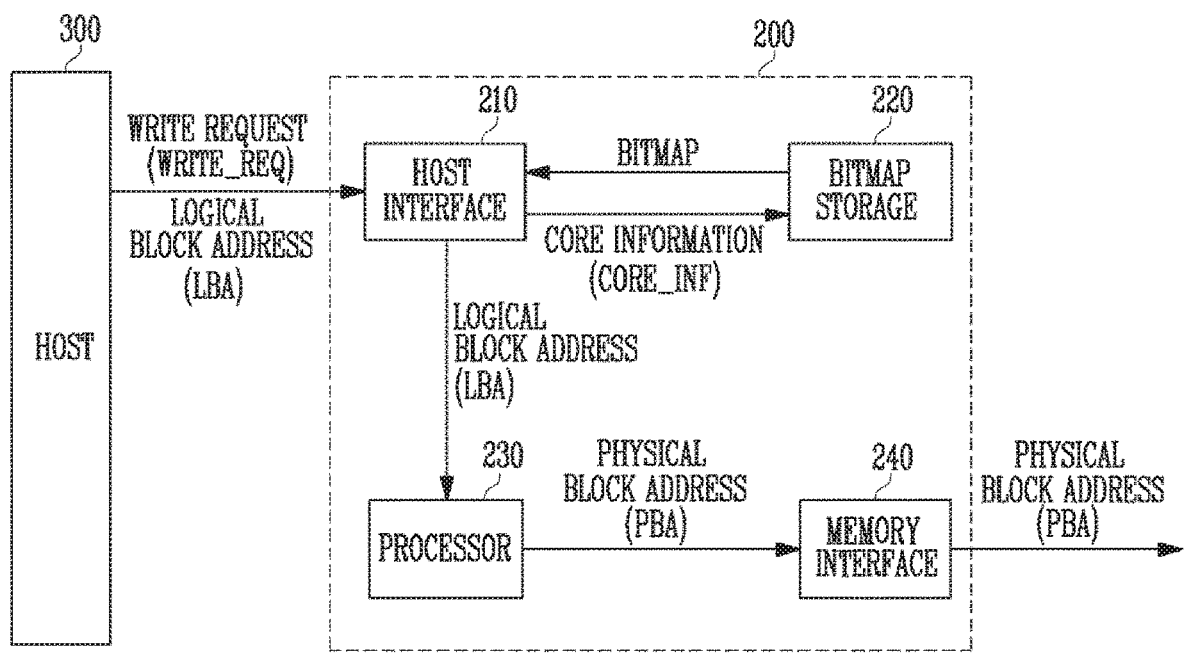
FIG. 3 is a diagram illustrating a configuration of a memory controller of FIG. 1.

FIG. 3 is a diagram illustrating the configuration of the memory controller of FIG. 1.

Referring to FIG. 3, the memory controller 200 may include a host interface 210, a bitmap storage 220, a processor 230, and a memory interface 240. In an embodiment, the host interface 210 may include the bitmap storage 220.

The host interface 210 may receive a request and a logical block address from a host 300. The logical block address (LBA) may be a logical address (LA) indicating a logical page.

In an embodiment, the host interface 210 may receive a write request WRITE_REQ and a logical block address corresponding to the write request WRITE_REQ from the host 300. The host interface 210 may output the logical block address to the processor 230 in order to perform an operation corresponding to the write request WRITE_REQ received from the host 300.

The host interface 210 may receive a bitmap from the bitmap storage 220 before outputting the logical block address to the processor 230. The bitmap may include bit values corresponding to logical block addresses. The bit values may be set depending on the cores to which respective logical block addresses are assigned, among multiple cores included in the processor 230. That is, bit values corresponding to respective logical block addresses may be the same value when the logical block addresses are assigned to the same core. Consequently, the bitmap may indicate a state in which logical block addresses are assigned to the multiple cores.

The host interface 210 may refer to the bitmap received from the bitmap storage 220. The host interface 210 may determine the core to which the logical block address is to be assigned based on the result of reference to the bitmap. That is, the host interface 210 may determine any one of the multiple cores to be the core to which the logical block address is to be assigned based on the bitmap.

An operation in which the host interface 210 assigns the logical block address received from the host 300 may be an operation of assigning the request corresponding to the logical block address to any one of the multiple cores included in the processor 230.

In detail, the host interface 210 may receive the bitmap from the bitmap storage 220, and may then determine which logical block addresses are assigned to which of the multiple cores. In detail, the host interface 210 may determine the number of logical block addresses assigned to each of the multiple cores based on the bitmap received from the bitmap storage 220.

The host interface 210 may determine the core to which the logical block address received from the host 300 is to be assigned, among the multiple cores included in the processor 230, based on an assignment ratio, which may be preset, and the numbers of logical block addresses respectively assigned to multiple cores. The assignment ratio may be determined based on capacities of the memory devices (e.g., the number of one or more memory devices) coupled to each of the multiple cores. The number of logical block addresses to be assigned to each of the multiple cores included in the processor 230 may be determined depending on the numbers of different bit values included in the bitmap. That is, the host interface 210 may determine the assignment ratio based on the number of memory devices coupled to each of the multiple cores, among the plurality of memory devices.

In an embodiment, when the same number of memory devices is coupled to each of the multiple cores, the host interface 210 may assign the logical block addresses to the multiple cores such that the number of logical block addresses assigned to each of the multiple cores may be the same. In an embodiment, when the different cores have different numbers of associated memory devices, i.e., the memory devices are not equally distributed among the multiple cores, the host interface 210 may assign the logical block addresses to the multiple cores according to the assignment ratio, that is, the ratio of the numbers of memory devices. For example, in an arrangement in which there are three cores including a first core that has five memory devices coupled to it, a second core that has three memory devices coupled to it, and a third core that has two memory devices coupled to it, the assignment ratio between the first and second cores would be 5:3, the assignment ratio between the first and third cores would be 5:2, and the assignment ratio between the second and third cores would be 3:2.

When the core to which the logical block address is to be assigned is determined among the multiple cores, the host interface 210 may output core information CORE_INF about the core to which the logical block address is to be assigned, to the bitmap storage 220.

In an embodiment, when the operation of any one of the multiple cores included in the processor 230, is stopped, the host interface 210 may assign one or more logical block addresses received during the stoppage to one or more of the remaining cores. Thereafter, when the core in which the operation is stopped resumes the operation, the host interface 210 may again receive the bitmap from the bitmap storage 220, and may then reassign the logical block address(es) received during the stoppage to one or more of the multiple cores according to the assignment ratio.

The bitmap storage 220 may store the bitmap. The bitmap may include bit values corresponding to respective logical block addresses received from the host 300. Each bit value stored in the bitmap storage 220 may indicate a particular one of the multiple cores.

The bit value may be set depending on the core to which logical block addresses are assigned, among multiple cores included in the processor 230. Also, the bit value may be set depending on the number of multiple cores. That is, the bitmap storage 220 may set a bit value corresponding to any one of the multiple cores depending on the number of multiple cores.

As a result, when plural logical block addresses are assigned to a single core among the multiple cores, the bit values corresponding to the assigned logical block addresses may be identical to each other.

The bitmap storage 220 may receive the core information CORE_INF from the host interface 210. The core information CORE_INF may include information about the core to which the corresponding logical block address is assigned, among the multiple cores included in the processor 230.

The bitmap storage 220 may receive the core information CORE_INF and then, based on that core information, change the bit value corresponding to the logical block address to a value indicating the core to which the logical block address is assigned. That is, the bitmap storage 220 may store the bitmap including information about the core to which the logical block address is assigned.

When the host interface 210 receives the write request WRITE_REQ and the logical block address from the host 300, the bitmap storage 220 may output the bitmap stored therein to the host interface 210. The host interface 210 may determine, based on the bitmap, the core to which the logical block address is to be output, among the multiple cores included in the processor 230.

The processor 230 may include at least one core. The core may generate mapping information indicating mapping relationships between logical block addresses (LBA) and physical block addresses (PBA). In an embodiment, the processor 230 may include multiple cores.

The processor 230 may receive the logical block address from the host interface 210. The processor 230 may assign the logical block address to the core determined by the host interface 210.

After generating the mapping information, the processor 230 may output a physical block address (PBA) corresponding to the logical block address. The physical block address (PBA) may indicate the location of a memory block included in any one of a plurality of memory devices. Alternatively, the physical block address (PBA) may indicate the location of any one of a plurality of dies included in a single memory device 100. That is, the physical block address (PBA) may be a physical address (PA) indicating a physical page.

The memory interface 240 may receive the physical block address (PBA) from the processor 230. The memory interface 240 may output the physical block address (PBA) to the memory device 100. The memory device 100 may receive the physical block address (PBA) and perform an operation corresponding to the request of the host 300. In an embodiment, since the request received from the host 300 is the write request WRITE_REQ, data received together with the physical block address (PBA) from the host 300 may be programmed to the corresponding physical block address (PBA).

The memory interface 240 may be coupled to a plurality of memory devices or dies through a plurality of channels. Each of the plurality of dies may include memory cells included in either a plurality of memory devices or a single memory device 100. The memory interface 240 may output the physical block address (PBA) received from the processor 230 to any one of the plurality of memory devices coupled to the channels or to any one of the plurality of dies coupled to the channels.

Figure 4:
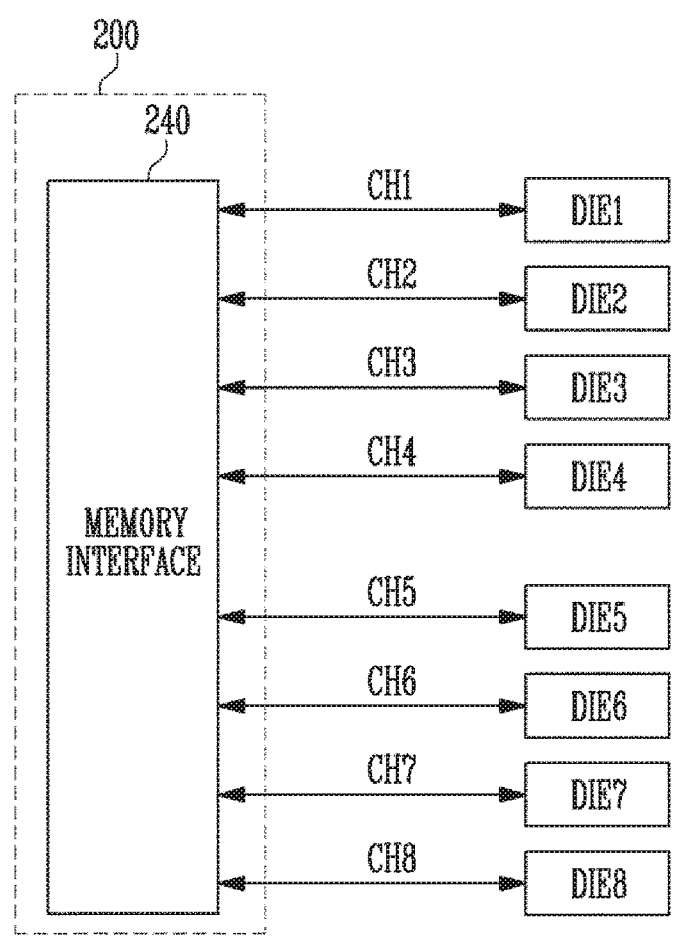
FIG. 4 is a diagram illustrating a plurality of dies coupled through a plurality of channels.

FIG. 4 is a diagram illustrating a plurality of dies coupled through a plurality of channels.

Referring to FIG. 4, a memory interface 240 may be coupled to first to eighth dies DIE1 to DIE8 through first to eighth channels CH1 to CH8 respectively. In the embodiment of FIG. 4, the first to fourth channels CH1 to CH4 are coupled to a 0-th core CORE0 through the memory interface 240 and the fifth to eighth channels CH5 to CH8 are coupled to a first core CORE1 through the memory interface 240. In this embodiment, a processor 230 is composed of the 0-th core CORE0 containing the first to fourth dies and the first core CORE1 containing the fifth to eighth dies.

In an embodiment, the first channel CH1 may be coupled to the first die DIE1, the second channel CH2 may be coupled to the second die DIE2, the third channel CH3 may be coupled to the third die DIE3, the fourth channel CH4 may be coupled to the fourth die DIE4, the fifth channel CH5 may be coupled to the fifth die DIE5, the sixth channel CH6 may be coupled to the sixth die DIE6, the seventh channel CH7 may be coupled to the seventh die DIE7, and the eighth channel CH8 may be coupled to the eighth die DIE8.

In an embodiment, the first to fourth dies DIE1 to DIE4 may be included in a single memory device 100 or a plurality of memory devices. Further, the fifth to eighth dies DIE5 to DIE8 may be included in a single memory device 100 or a plurality of memory devices.

In an arrangement, such as that shown in FIG. 4, in which the first to eighth dies DIE1 to DIE8 are distributed among a plurality of memory devices, the first DIE1 is included in a first memory device, the second die DIE2 is included in a second memory device, the third die DIE3 is included in a third memory device, the fourth die DIE4 is included in a fourth memory device, the fifth die DIE5 is included in a fifth memory device, the sixth die DIE6 is included in a sixth memory device, the seventh die DIE7 is included in a seventh memory device, and the eighth die DIE8 is included in an eighth memory device.

Although not illustrated in the drawing, the memory interface 240 may be coupled to the 0-th core CORE0 and the first core CORE1 included in the processor 230. Therefore, when a logical block address received from the host interface 210 is assigned to the 0-th core CORE0, the memory interface 240 may output the physical block address (PBA) received from the processor 230 to any one of the first to fourth dies DIE1 to DIE4. When the logical block address received from the host interface 210 is assigned to the first core CORE1, the memory interface 240 may output the physical block address (PBA) received from the processor 230 to any one of the fifth to eighth dies DIE5 to DIE8.

In an embodiment, depending on the number of dies coupled to each of the multiple cores included in the processor 230 through the memory interface 240, the number of logical block addresses to be assigned by the host interface 210 to each of the multiple cores may be set. In FIG. 4, the number of dies coupled to the 0-th core CORE0 is 4 and the number of dies coupled to the first core CORE1 is 4, and thus the host interface 210 may assign the logical block addresses to the 0-th core CORE0 and the first core CORE1 such that the numbers of logical block addresses that are assigned to the 0-th core CORE0 and the first core CORE1 are equal to each other.

In an embodiment, when the numbers of dies respectively coupled to multiple cores through the memory interface 240 are not equal to each other, the host interface 210 may assign logical block addresses based on the numbers of dies coupled to respective cores. That is, depending on the ratio of the numbers of dies coupled to respective cores, the logical block addresses may be assigned.

Figure 5:
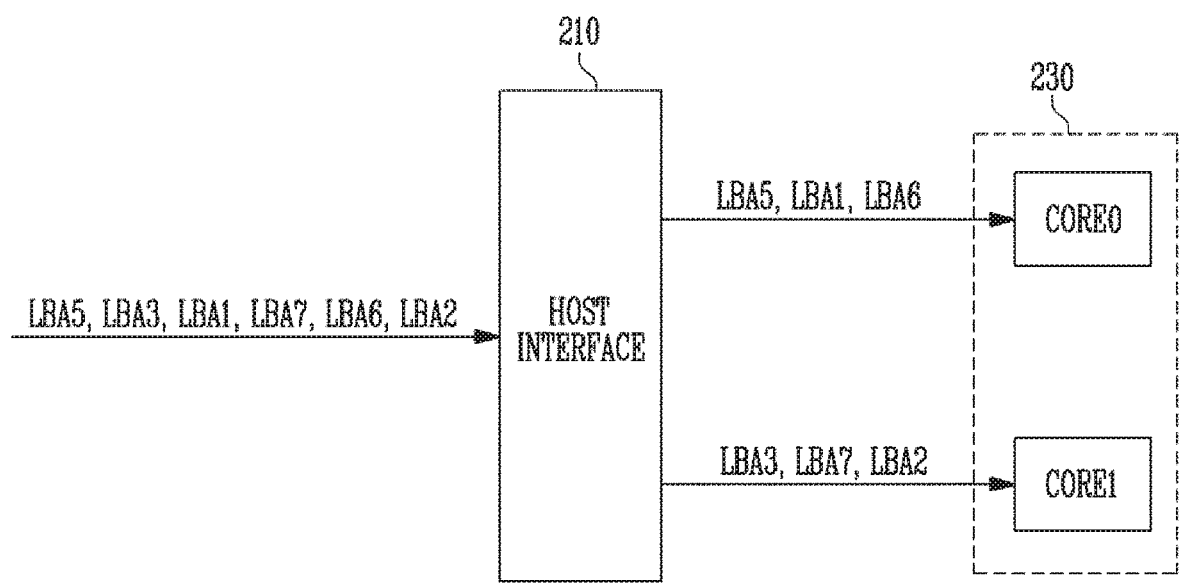
FIG. 5 is a diagram illustrating an embodiment in which logical block addresses are equally or evenly assigned to multiple cores.

FIG. 5 is a diagram illustrating an embodiment in which logical block addresses are equally or evenly assigned to multiple cores.

Referring to FIG. 5, a host interface 210 may sequentially receive a fifth logical block address (LBA5), a third logical block address (LBA3), a first logical block address (LBA1), a seventh logical block address (LBA7), a sixth logical block address (LBA6), and a second logical block address (LBA2) from a host 300. The host interface 210 may output the received logical block addresses to a processor 230. The logical block address (LBA) may be a logical address (LA) indicating a logical page.

In FIG. 5, the processor 230 may include a 0-th core CORE0 and a first core CORE1. That is, the processor 230 may include multiple cores. In an embodiment, the number of cores included in the processor 230 may vary. In the embodiment of FIG. 5, the number of dies coupled to each core through the memory interface 240 is the same. Each core may generate mapping information indicating mapping relationships between logical block addresses (LBA) and physical block addresses (PBA).

In an embodiment, a logical block address received first by the host interface 210 may be the fifth logical block address (LBA5). Addresses received from the host 300 before the host interface 210 receives the fifth logical block address (LBA5) may be equally or evenly assigned to the 0-th core CORE0 and the first core CORE1.

FIG. 5 illustrates a case where the host interface 210 first receives one or more other logical block addresses or previously-received logical block addresses have been equally or evenly assigned to the 0-th core CORE0 and the first core CORE1 before the fifth logical block address (LBA5) is received.

In an embodiment, the host interface 210 may assign the fifth logical block address (LBA5) to the 0-th core CORE0. That is, the 0-th core CORE0 may be a starting core on which the assignment of logical block addresses is initiated.

The host interface 210 may assign the fifth logical block address (LBA5) to the 0-th core CORE0 and thereafter assign the third logical block address (LBA3) to the first core CORE1. In detail, since the numbers of dies coupled to the 0-th core CORE0 and the first core CORE1 through the memory interface 240 are equal to each other, the host interface 210 is configured to, when any one of logical block addresses received from the host 300 is assigned to the 0-th core CORE0, assign the logical block address, which is to be assigned to the core after the assignment to the 0-th core CORE0, to the first core CORE1.

In this sequence, when the fifth logical block address (LBA5) is assigned to the 0-th core CORE0, the host interface 210 may assign the third logical block address (LBA3) to the first core CORE1. When the third logical block address (LBA3) is assigned to the first core CORE1, the host interface 210 may assign the first logical block address (LBA1) to the 0-th core CORE0. When the first logical block address (LBA1) is assigned to the 0-th core CORE0, the host interface 210 may assign the seventh logical block address (LBA7) to the first core CORE1. When the seventh logical block address (LBA7) is assigned to the first core CORE1, the host interface 210 may assign the sixth logical block address (LBA6) to the 0-th core CORE0. When the sixth logical block address (LBA6) is assigned to the 0-th core CORE0, the host interface 210 may assign the second logical block address (LBA2) to the first core CORE1.

Consequently, the host interface 210 may equally or evenly assign the logical block addresses received from the host 300 to the multiple cores. Therefore, the host interface 210 may assign the corresponding logical block address to any one of multiple cores depending on an assignment ratio regardless of whether the logical block address is an even address (Even LBA) or an odd address (Odd LBA).

FIG. 6 is a diagram illustrating a bitmap indicating cores to which logical block addresses are assigned.

Referring to FIG. 6, a first row indicates logical block addresses received from a host 300. A second row indicates a bitmap including bit values corresponding to the respective logical block addresses. One of the bit values included in the bitmap, e.g., "0" indicates that a logical block address is assigned to a 0-th core CORE0, and the other bit value, e.g., "1" indicates that a logical block address is assigned to a first core CORE1. The bit values included in the bitmap may be set depending on the number of multiple cores included in a processor 230.

In FIG. 6, a host interface 210 receives 0-th to ninth logical block addresses (LBA0 to LBA9) from the host 300, although more than 10 logical block addresses may be received from the host 300.

Referring to FIGS. 5 and 6, the host interface 210 may sequentially receive a fifth logical block address (LBA5), a third logical block address (LBA3), a first logical block address (LBA1), a seventh logical block address (LBA7), a sixth logical block address (LBA6), and a second logical block address (LBA2) from the host 300. FIG. 6 illustrates a process in which, after the host interface 210 has determined to assign the logical block addresses received from the host 300 to any one of the 0-th core CORE0 and the first core CORE1 included in the processor 230 in FIG. 5, the bit values stored in the bitmap are changed.

In an embodiment, when the cores to which the logical block addresses received from the host 300 are to be assigned are determined, the host interface 210 may output core information CORE_INF to a bitmap storage 220. The core information CORE_INF may include information about the cores to which the logical block addresses are to be assigned. The bitmap storage 220 may change bit values included in the bitmap based on the core information CORE_INF received from the host interface 210.

First, the host interface 210 may determine to assign the fifth logical block address (LBA5), received from the host 300, to the 0-th core CORE0. When it is determined to assign the fifth logical block address (LBA5) to the 0-th core CORE0, the host interface 210 may output the core information CORE_INF including information about the core, to which the fifth logical block address (LBA5) is to be assigned, to the bitmap storage 220. The bitmap storage 220 may receive the core information CORE_INF and change a bit value corresponding to the fifth logical block address (LBA5) to "0".

After it is determined to assign the fifth logical block address (LBA5) to the 0-th core CORE0, the host interface 210 may determine to assign the third logical block address (LBA3) to the first core CORE1. When it is determined to assign the third logical block address (LBA3) to the first core CORE1, the host interface 210 may output the core information CORE_INF including information about the core, to which the third logical block address (LBA3) is to be assigned, to the bitmap storage 220. The bitmap storage 220 may receive the core information CORE_INF and change a bit value corresponding to the third logical block address (LBA3) to "1".

After it is determined to assign the third logical block address (LBA3) to the first core CORE1, the host interface 210 may determine to assign the first logical block address (LBA1) to the 0-th core CORE0. When it is determined to assign the first logical block address (LBA1) to the 0-th core CORE0, the host interface 210 may output the core information CORE_INF including information about the core, to which the first logical block address (LBA1) is to be assigned, to the bitmap storage 220. The bitmap storage 220 may receive the core information CORE_INF and change a bit value corresponding to the first logical block address (LBA1) to "0".

By means of the above scheme, the bit value corresponding to the seventh logical block address (LBA7) may be changed to "1", the bit value corresponding to the sixth logical block address (LBA6) may be changed to "0", and the bit value corresponding to the second logical block address (LBA2) may be changed to "1".

Figure 7:
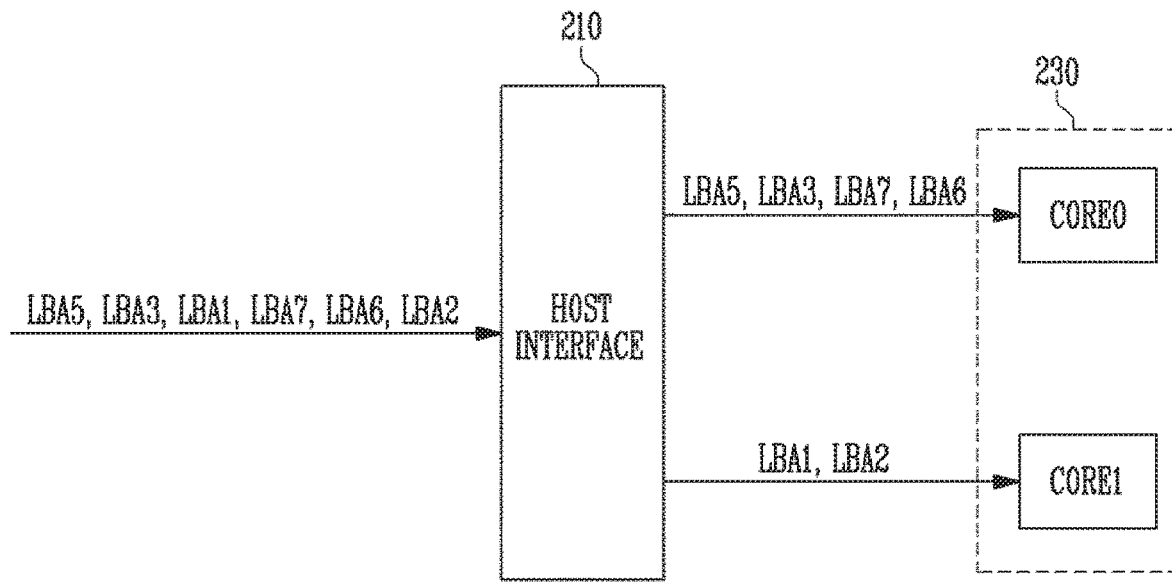
FIG. 7 is a diagram illustrating an embodiment in which logical block addresses are equally or evenly assigned when the numbers of dies coupled to respective cores are different from each other.

FIG. 7 is a diagram illustrating an embodiment in which logical block addresses are equally or evenly assigned when the numbers of dies coupled to respective cores are different from each other.

Referring to FIG. 7, a host interface 210 may sequentially receive a fifth logical block address (LBA5), a third logical block address (LBA3), a first logical block address (LBA1), a seventh logical block address (LBA7), a sixth logical block address (LBA6), and a second logical block address (LBA2) from a host 300. The host interface 210 may output the received logical block addresses to a processor 230. Each logical block address (LBA) may be a logical address (LA) indicating a logical page.

In FIG. 7, the processor 230 may include a 0-th core CORE0 and a first core CORE1. That is, the processor 230 may include multiple cores. In an embodiment, the number of cores included in the processor 230 may vary. In FIG. 7, the numbers of dies coupled to respective cores through a memory interface 240 are different from each other. In FIG. 7, the number of dies coupled to the 0-th core CORE0 is twice the number of dies coupled to the first core CORE1. Also, the number of logical block addresses assigned to the 0-th core CORE0 before the host interface 210 receives the fifth logical block address (LBA5) is twice the number of logical block addresses assigned to the first core CORE1, and the logical block addresses are equally or evenly assigned based on the number of dies coupled to respective cores.

Each core may generate mapping information indicating mapping relationships between logical block addresses (LBA) and physical block addresses (PBA).

In an embodiment, the host interface 210 may assign the fifth logical block address (LBA5) to the 0-th core CORE0. The host interface 210 may assign the fifth logical block address (LBA5) to the 0-th core CORE0 and thereafter assign the third logical block address (LBA3) to the 0-th core CORE0. In detail, since the number of dies coupled to the 0-th core CORE0 through the memory interface 240 is twice the number of dies coupled to the first core CORE1, the host interface 210 may assign two logical block addresses, among the logical block addresses received from the host 300, to the 0-th core CORE0, and thereafter assign one logical block address to the first core CORE1.

In this sequence, when the fifth and third logical block addresses (LBA5 and LBA3) are assigned to the 0-th core CORE0, the host interface 210 may assign the first logical block address (LBA1) to the first core CORE1. When the first logical block address (LBA1) is assigned to the first core CORE1, the host interface 210 may assign the seventh and sixth logical block addresses (LBA7 and LBA6) to the 0-th core CORE0. When the seventh and sixth logical block addresses (LBA7 and LBA6) are assigned to the 0-th core CORE0, the host interface 210 may assign the second logical block address (LBA2) to the first core CORE1.

Figure 8:
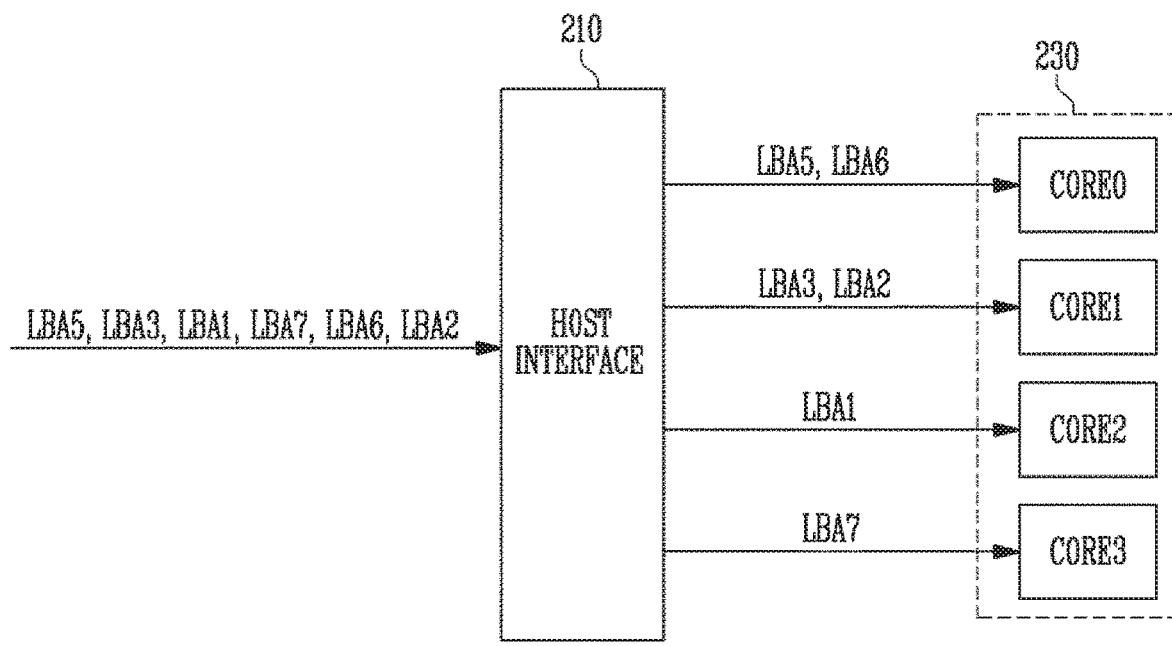
FIG. 8 is a diagram illustrating an embodiment in which logical block addresses are equally or evenly assigned to four cores when there are four cores.

FIG. 8 is a diagram illustrating an embodiment in which logical block addresses are equally or evenly assigned to four cores.

Referring to FIG. 8, a host interface 210 may sequentially receive a fifth logical block address (LBA5), a third logical block address (LBA3), a first logical block address (LBA1), a seventh logical block address (LBA7), a sixth logical block address (LBA6), and a second logical block address (LBA2) from a host 300. The host interface 210 may output the received logical block addresses to a processor 230. Each logical block address (LBA) may be a logical address (LA) indicating a logical page.

In FIG. 8, the processor 230 may include 0-th to third cores CORE0 to CORE3. In an embodiment, the processor 230 may include a larger number of cores. In FIG. 8, the numbers of dies coupled to respective cores through the memory interface 240 are equal to each other. Each core may generate mapping information indicating mapping relationships between logical block addresses (LBA) and physical block addresses (PBA).

FIG. 8 illustrates a case where the fifth logical block address (LBA5) is received when the host interface 210 first receives a logical block address or after logical block addresses are equally or evenly assigned to the 0-th to third cores CORE0 to CORE3 before the fifth logical block address (LBA5) is received.

In an embodiment, the host interface 210 may assign the fifth logical block address (LBA5) to the 0-th core CORE0. That is, the 0-th core CORE0 may be a starting core on which the assignment of logical block addresses is initiated.

The host interface 210 may assign the fifth logical block address (LBA5) to the 0-th core CORE0 and thereafter assign the third logical block address (LBA3) to the first core CORE1. After the third logical block address (LBA3) has been assigned to the first core CORE1, the host interface 210 may assign the first logical block address (LBA1) to the second core CORE2. After the first logical block address (LBA1) has been assigned to the second core CORE2, the host interface 210 may assign the seventh logical block address (LBA7) to the third core CORE3.

In detail, since the numbers of dies coupled to the 0-th to third cores CORE0 to CORE3 through the memory interface 240 are equal to each other, the host interface 210 may sequentially assign the logical block addresses received from the host 300 to the 0-th to third cores CORE0 to CORE3.

In an embodiment, after the seventh logical block address (LBA7) has been assigned to the third core CORE3, a next logical block address may be assigned again to the 0-th core CORE0. Therefore, after the seventh logical block address (LBA7) has been assigned to the third core CORE3, the host interface 210 may assign the sixth logical block address (LBA6) to the 0-th core CORE0. After the sixth logical block address (LBA6) has been assigned to the 0-th core CORE0, the host interface 210 may assign the second logical block address (LBA2) to the first core CORE1.

In an embodiment, after the second logical block address (LBA2) has been assigned to the first core CORE1, the logical block addresses received from the host 300 may be sequentially assigned to the cores starting from the second core CORE2. That is, the logical block addresses received from the host 300 may be evenly assigned to the 0-th to third cores CORE0 to CORE3 regardless of whether each logical block address is an even address (Even LBA) or an odd address (Odd LBA).

FIG. 9 is a diagram for explaining a bitmap indicating cores to which logical block addresses are assigned when there are four cores.

Referring to FIG. 9, a first row indicates logical block addresses received from a host 300. A second row indicates a bitmap including bit values corresponding to respective logical block addresses. Each logical block address (LBA) may be a logical address (LA) indicating a logical page.

In FIG. 9, of the bit values included in the bitmap, "00" is exemplified to indicate that a logical block address is assigned to a 0-th core CORE0. Of the bit values included in the bitmap, "01" is exemplified to indicate that a logical block address is assigned to a first core CORE1. Of the bit values included in the bitmap, "11" is exemplified to indicate that a logical block address is assigned to a second core CORE2. Of the bit values included in the bitmap, "10" is exemplified to indicate that a logical block address is assigned to a third core CORE3. The bit value indicating the core to which the logical block address is assigned may be variously set in addition to the above values. Also, the bit values included in the bitmap may be set depending on the number of multiple cores included in the processor 230. That is, the bitmap storage 220 may set a bit value corresponding to any one of the multiple cores depending on the number of multiple cores.

In FIG. 9, a host interface 210 is assumed to receive 0-th to ninth logical block addresses (LBA0 to LBA9) from the host 300. In an embodiment, the host interface 210 may receive a larger number of logical block addresses from the host 300.

Referring to FIGS. 8 and 9, the host interface 210 may sequentially receive a fifth logical block address (LBA5), a third logical block address (LBA3), a first logical block address (LBA1), a seventh logical block address (LBA7), a sixth logical block address (LBA6), and a second logical block address (LBA2) from the host 300. FIG. 9 illustrates a process in which, after the host interface 210 has determined to assign the logical block addresses received from the host 300 to any one of the 0-th to third cores CORE0 to CORE3 included in the processor 230 in FIG. 8, the bit values stored in the bitmap are changed.

In an embodiment, when the cores to which the logical block addresses received from the host 300 are to be assigned are determined, the host interface 210 may output core information CORE_INF to a bitmap storage 220. The core information CORE_INF may include information about the cores to which the logical block addresses are to be assigned. The bitmap storage 220 may change bit values included in the bitmap based on the core information CORE_INF received from the host interface 210.

First, the host interface 210 may determine to assign the fifth logical block address (LBA5), received from the host 300, to the 0-th core CORE0. When it is determined to assign the fifth logical block address (LBA5) to the 0-th core CORE0, the host interface 210 may output the core information CORE_INF including information about the core, to which the fifth logical block address (LBA5) is to be assigned, to the bitmap storage 220. The bitmap storage 220 may receive the core information CORE_INF and change a bit value corresponding to the fifth logical block address (LBA5) to "00".

After it is determined to assign the fifth logical block address (LBA5) to the 0-th core CORE0, the host interface 210 may determine to assign the third logical block address (LBA3) to the first core CORE1. When it is determined to assign the third logical block address (LBA3) to the first core CORE1, the host interface 210 may output the core information CORE_INF including information about the core, to which the third logical block address (LBA3) is to be assigned, to the bitmap storage 220. The bitmap storage 220 may receive the core information CORE_INF and then change a bit value corresponding to the third logical block address (LBA3) to "01".

After it is determined to assign the third logical block address (LBA3) to the first core CORE1, the host interface 210 may determine to assign the first logical block address (LBA1) to the second core CORE2. When it is determined to assign the first logical block address (LBA1) to the second core CORE2, the host interface 210 may output the core information CORE_INF including information about the core, to which the first logical block address (LBA1) is to be assigned, to the bitmap storage 220. The bitmap storage 220 may receive the core information CORE_INF and change a bit value corresponding to the first logical block address (LBA1) to "11".

After it is determined to assign the first logical block address (LBA1) to the second core CORE2, the host interface 210 may determine to assign the seventh logical block address (LBA7) to the third core CORE3. When it is determined to assign the seventh logical block address (LBA7) to the third core CORE3, the host interface 210 may output the core information CORE_INF including information about the core, to which the seventh logical block address (LBA7) is to be assigned, to the bitmap storage 220. The bitmap storage 220 may receive the core information CORE_INF and change a bit value corresponding to the seventh logical block address (LBA7) to "10".

Through the above-described scheme, a bit value corresponding to the sixth logical block address (LBA6) may be changed to "00", and a bit value corresponding to the second logical block address (LBA2) may be changed to "01".

Figures 10A, 10B:
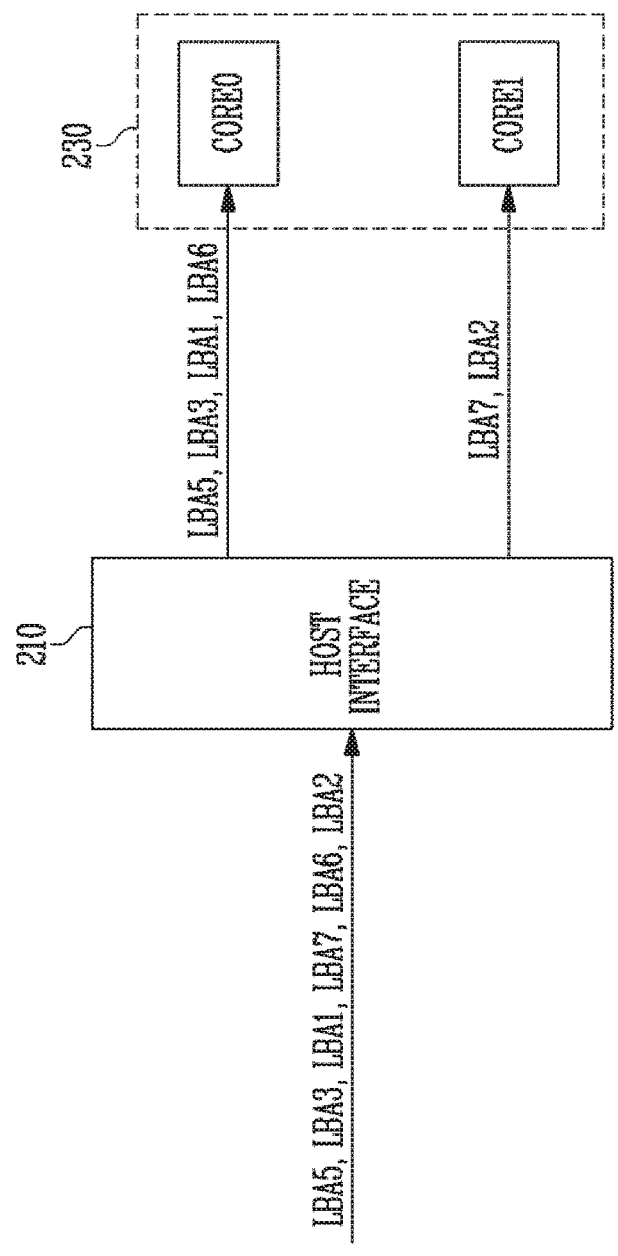
FIGS. 10A and 10B are diagrams illustrating an embodiment in which logical block addresses are equally or evenly assigned after a bitmap has been received from a bitmap storage.

FIGS. 10A and 10B are diagrams illustrating an embodiment in which logical block addresses are evenly assigned after a bitmap has been received from a bitmap storage.

Referring to FIGS. 10A and 10B, FIG. 10A illustrates a bitmap stored in a bitmap storage 220, after fourth and eighth logical block addresses (LBA4 and LBA8), received from a host 300, have been assigned to a first core CORE1. FIG. 10B illustrates a method in which, after the fourth and eighth logical block addresses (LBA4 and LBA8) have been assigned to the first core CORE1, logical block addresses received from the host 300 are assigned to 0-th and first cores CORE0 and CORE1. In FIG. 10B, the numbers of dies coupled to the 0-th and first cores CORE0 and CORE1, respectively, are equal to each other. Therefore, the ratio of logical block addresses to be assigned to the 0-th and first cores CORE0 and CORE1 may be "1:1". The ratio of logical block addresses to be assigned to the 0-th and first cores CORE0 and CORE1 may be preset depending on the numbers of dies coupled to the 0-th and first cores CORE0 and CORE1.

FIG. 10A illustrates a bitmap that includes bit values indicating cores to which logical block addresses, received before logical block addresses are received from the host 300, are assigned. In an embodiment, of the bit values included in the bitmap, "0" indicates that a logical block address is assigned to the 0-th core CORE0. Also, of the bit values included in the bitmap, "1" indicates that a logical block address is assigned to the first core CORE1. The bit values included in the bitmap may be set depending on the number of multiple cores included in a processor 230.

In an embodiment, the host interface 210 may receive the fourth and eighth logical block addresses (LBA4 and LBA8) before receiving the fifth logical block address (LBA5), the third logical block address (LBA3), the first logical block address (LBA1), the seventh logical block address (LBA7), the sixth logical block address (LBA6), and the second logical block address (LBA2) from the host 300. The fourth and eighth logical block addresses (LBA4 and LBA8) may be assigned to the first core CORE1, among the cores included in the processor 230. Therefore, bit values corresponding to the fourth and eighth logical block addresses (LBA4 and LBA8) may be "1".

After the fourth and eighth logical block addresses (LBA4 and LBA8) have been assigned to the first core CORE1, the host interface 210 may sequentially receive the fifth logical block address (LBA5), the third logical block address (LBA3), the first logical block address (LBA1), the seventh logical block address (LBA7), the sixth logical block address (LBA6), and the second logical block address (LBA2) from the host 300. After receiving the logical block addresses from the host 300, the host interface 210 may receive the bitmap from the bitmap storage 220. The host interface 210 may determine cores to which the logical block addresses received from the host 300 are to be assigned, based on the bit values included in the bitmap.

That is, the host interface 210 may refer to the bitmap received from the bitmap storage 220. The host interface 210 may determine the cores to which the logical block addresses are to be assigned, based on the result of reference to the bitmap.

In an embodiment, since the numbers of dies coupled to the 0-th and first cores CORE0 and CORE1 are equal to each other, the numbers of logical block addresses to be assigned to the 0-th and first cores CORE0 and CORE1 may be even. However, before the host interface 210 receives the fifth logical block address (LBA5) from the host 300, the fourth and eighth logical block addresses (LBA4 and LBA8) have been assigned to the first core CORE1, and thus the numbers of logical block addresses assigned to the 0-th and first cores CORE0 and CORE1 may not be even. The host interface 210 may assign the fifth logical block address (LBA5) to the 0-th core CORE0, to which a smaller number of logical block addresses are assigned, between the 0-th and first cores CORE0 and CORE1. That is, the host interface 210 may assign the corresponding logical block address to a core to which a smallest number of logical block addresses are assigned, among the multiple cores.

Until the ratio of assignment of logical block addresses to the 0-th and first cores CORE0 and CORE1 becomes 1:1, the host interface 210 may assign the logical block addresses to the 0-th core CORE0. Therefore, after the fifth logical block address (LBA5) has been assigned to the 0-th core CORE0, the host interface 210 may assign the third logical block address (LBA3) to the 0-th core CORE0.

When the third logical block address (LBA3) is assigned to the 0-th core CORE0, the ratio of the logical block addresses assigned to the 0-th and first cores CORE0 and CORE1 may be "1:1" that is an assignment ratio. Therefore, after the third logical block address (LBA3) has been assigned to the 0-th core CORE0, the host interface 210 may assign the first logical block address (LBA1) to the 0-th core CORE0 which is a starting core on which assignment of logical block addresses is initiated.

In order to evenly assign logical block addresses to the 0-th and first cores CORE0 and CORE1 after the first logical block address (LBA1) has been assigned to the 0-th core CORE0, the host interface 210 may assign the seventh logical block address (LBA7) and the second logical block address (LBA2) to the first core CORE1 and assign the sixth logical block address (LBA6) to the 0-th core CORE0. Thereafter, logical block addresses received from the host 300 may be evenly assigned to the 0-th and first cores CORE0 and CORE1.

Figures 11A, 11B:
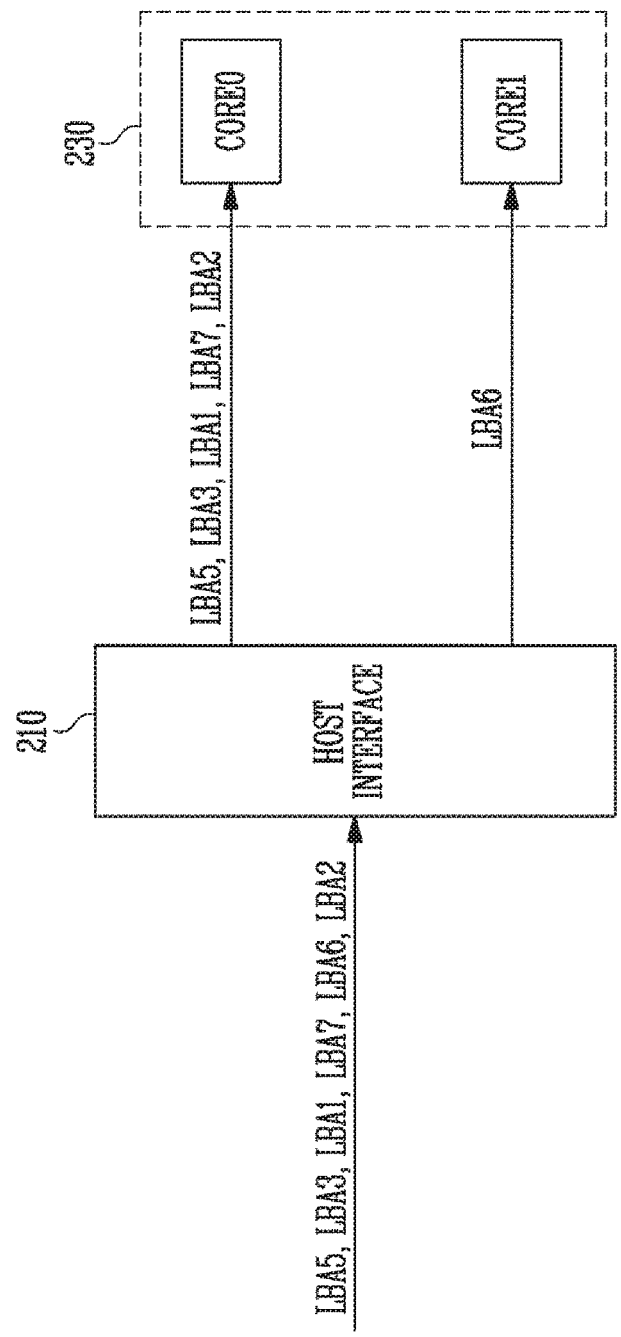
FIGS. 11A and 11B are diagrams illustrating an embodiment in which logical block addresses are equally or evenly assigned after a bitmap has been received from a bitmap storage.

FIGS. 11A and 11B are diagrams illustrating an embodiment in which logical block addresses are evenly assigned after a bitmap has been received from a bitmap storage.

Referring to FIGS. 11A and 11B, FIG. 11A illustrates a bitmap stored in a bitmap storage 220 after a fourth logical block address (LBA4) received from a host 300 has been assigned to a first core CORE1. FIG. 11B illustrates a method in which, after the fourth logical block address (LBA4) has been assigned to the first core CORE1, logical block addresses received from the host 300 are assigned to 0-th and first cores CORE0 and CORE1. In FIG. 11B, the number of dies coupled to the 0-th core CORE0 is twice the number of dies coupled to the first core CORE1. Therefore, the ratio of logical block addresses to be assigned to the 0-th and first cores CORE0 and CORE1 may be 2:1. The ratio of logical block addresses to be assigned to the 0-th and first cores CORE0 and CORE1 may be preset depending on the numbers of dies coupled to the 0-th and first cores CORE0 and CORE1.

FIG. 11A illustrates a bitmap that includes bit values indicating cores to which logical block addresses, received before logical block addresses are received from the host 300, are assigned. In an embodiment, it is exemplified that, of the bit values included in the bitmap, "0" indicates that a logical block address is assigned to the 0-th core CORE0. Also, of the bit values included in the bitmap, "1" is exemplified to indicate that a logical block address is assigned to the first core CORE1. The bit values included in the bitmap may be set depending on the number of multiple cores included in a processor 230.

In an embodiment, the host interface 210 may receive the fourth logical block addresses (LBA4) before receiving the fifth logical block address (LBA5), the third logical block address (LBA3), the first logical block address (LBA1), the seventh logical block address (LBA7), the sixth logical block address (LBA6), and the second logical block address (LBA2) from the host 300. The fourth logical block address (LBA4) may be assigned to the first core CORE1, among the cores included in the processor 230. Therefore, a bit value corresponding to the fourth logical block address (LBA4) may be "1".

After the fourth logical block addresses (LBA4) has been assigned to the first core CORE1, the host interface 210 may sequentially receive the fifth logical block address (LBA5), the third logical block address (LBA3), the first logical block address (LBA1), the seventh logical block address (LBA7), the sixth logical block address (LBA6), and the second logical block address (LBA2) from the host 300. After receiving the logical block addresses from the host 300, the host interface 210 may receive the bitmap from the bitmap storage 220. The host interface 210 may determine cores to which the logical block addresses received from the host 300 are to be assigned, based on the bit values included in the bitmap.

In an embodiment, since the number of dies coupled to the 0-th core CORE0 is twice the number of dies coupled to the first core CORE1, the number of logical block addresses assigned to the 0-th core CORE0 may be twice the number of logical block addresses assigned to the first core CORE1. However, before the host interface 210 receives the fifth logical block address (LBA5) from the host 300, the fourth logical block address (LBA4) has been assigned to the first core CORE1, and thus the host interface 210 may assign the fifth logical block address (LBA5) to the 0-th core CORE0, to which a smaller number of logical block addresses are assigned, between the 0-th and first cores CORE0 and CORE1. That is, the host interface 210 may assign the corresponding logical block address to a core to which a smallest number of logical block addresses are assigned, among the multiple cores.

Until the ratio of assignment of logical block addresses to the 0-th and first cores CORE0 and CORE1 becomes 2:1, the host interface 210 may assign the logical block addresses to the 0-th core CORE0. Therefore, after the fifth logical block address (LBA5) has been assigned to the 0-th core CORE0, the host interface 210 may assign the third logical block address (LBA3) to the 0-th core CORE0.

When the third logical block address (LBA3) is assigned to the 0-th core CORE0, the ratio of the logical block addresses assigned to the 0-th and first cores CORE0 and CORE1 may be 2:1, which is an assignment ratio. Therefore, after the third logical block address (LBA3) has been assigned to the 0-th core CORE0, the host interface 210 may assign the first logical block address (LBA1) to the 0-th core CORE0 which is a starting core on which assignment of logical block addresses is initiated.

After the first logical block address (LBA1) has been assigned to the 0-th core CORE0, the host interface 210 may assign the seventh logical block address (LBA7) to the 0-th core CORE0 and assign the sixth logical block address (LBA6) to the first core CORE1 so that the ratio of logical block addresses assigned to the 0-th and first cores CORE0 and CORE1 becomes 2:1. Thereafter, logical block addresses received from the host 300 may be assigned to the 0-th and first cores CORE0 and CORE1 at the assignment ratio.

Figure 12:
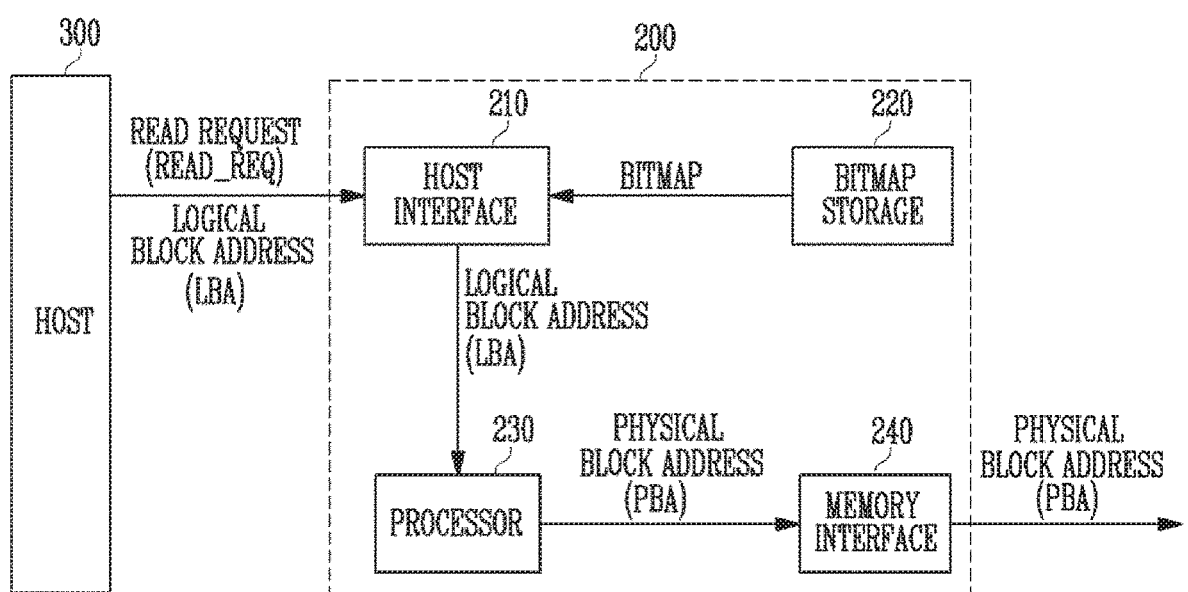
FIG. 12 is a diagram illustrating a method of assigning logical block addresses to cores when a read request is received from a host.

FIG. 12 is a diagram illustrating a method of assigning logical block addresses to cores when a read request is received from a host.

Referring to FIGS. 3 and 12, a memory controller 200 may include a host interface 210, a bitmap storage 220, a processor 230, and a memory interface 240. In other embodiments, the host interface 210 may include the bitmap storage 220.

The host interface 210 may receive a request and a logical block address from the host 300. In an embodiment, the host interface 210 may receive a read request READ_REQ and a logical block address (LBA) corresponding to the read request READ_REQ from the host 300. The host interface 210 may output the logical block address to the processor 230 so as to perform an operation corresponding to the read request READ_REQ received from the host 300.

The host interface 210 may receive a bitmap from the bitmap storage 220 before the logical block address is output to the processor 230. The bitmap may include a bit value corresponding to the logical block address. The bit value may be set depending on the core to which each logical block address is assigned, among multiple cores included in the processor 230. That is, bit values corresponding to respective logical block addresses may be equal to each other when logical block addresses are assigned to a single core represented by the bit value. Consequently, the bitmap may indicate a state in which logical block addresses are assigned to multiple cores.

In detail, the host interface 210 may receive the bitmap from the bitmap storage 220, and may then determine the state in which logical block addresses are assigned to the multiple cores. The host interface 210 may determine, based on the bitmap, a core to which the corresponding logical block address received from the host 300 is to be assigned. That is, the host interface 210 may determine the core to which the logical block address is to be assigned, among the multiple cores included in the processor 230, based on the bitmap. The core to which the logical block address is to be assigned may be determined based on the bit values included in the bitmap.

The host interface 210 may determine the core to which the logical block address received from the host 300 is to be assigned, and may output the logical block address to the corresponding core. That is, the host interface 210 may output the logical block address to the core to which the logical block address is determined to be assigned, among the multiple cores included in the processor 230.

The processor 230 may include at least one core. The core may control a memory device 100. In an embodiment, when there are multiple cores, each of the multiple cores may control a plurality of memory devices.

Each core may store mapping information generated in response to a write request WRITE_REQ that has been received before the read request READ_REQ is received from the host 300. The mapping information may indicate mapping relationships between logical block addresses (LBA) and physical block addresses (PBA). In an embodiment, the processor 230 may include multiple cores.

The processor 230 may receive the logical block address from the host interface 210. The processor 230 may assign the logical block address to the core determined by the host interface 210. The mapping information related to the logical block address received from the host 300 may be stored in the core determined by the host interface 210.

The processor 230 may receive the logical block address (LBA) from the host interface 210, and may output a physical block address (PBA) having a mapping relationship with the corresponding logical block address to the memory interface 240. The physical block address (PBA) may indicate the location of a memory block included in any one of a plurality of memory devices. Alternatively, the physical block address (PBA) may indicate the location of any one of a plurality of dies included in a single memory device 100.

The memory interface 240 may receive the physical block address (PBA) from the processor 230. The memory interface 240 may output the received physical block address (PBA) to the memory device 100. The memory device 100 may perform an operation corresponding to the request received from the host 300 by receiving the physical block address (PBA). Since the request received from the host 300 is the read request READ_REQ, the memory device 100 may output data stored at the corresponding physical block address (PBA) to the memory controller 200.

The memory interface 240 may be coupled to a plurality of memory devices or a plurality of dies through a plurality of channels. Each of the plurality of dies may include memory cells included in either a plurality of memory devices or a single memory device 100. The memory interface 240 may output the physical block address (PBA) received from the processor 230 to any one of the plurality of memory devices coupled to the channels or to any one of the plurality of dies coupled to the channels. In response to the read request READ_REQ received from the host 300, the memory device 100 may output the data stored at the corresponding physical block address (PBA) to the memory controller 200.

Figure 13:
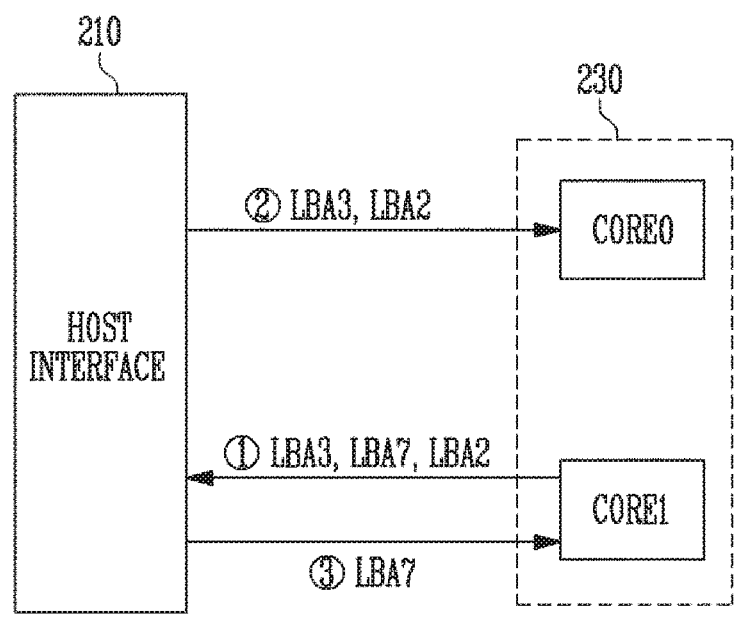
FIG. 13 is a diagram illustrating a method of assigning logical block addresses to cores when garbage collection is performed.

FIG. 13 is a diagram illustrating a method of assigning logical block addresses to cores when garbage collection is performed.

Referring to FIG. 13, when a memory controller 200 performs garbage collection, a processor 230 may output logical block addresses, respectively corresponding to physical block addresses of a victim memory block that is the target of garbage collection (GC), to the host interface 210. The host interface 210 may sequentially receive those logical block addresses. In FIG. 13, the processor 230 includes a 0-th core CORE0 and a first core CORE1. Each logical block address (LBA) may be a logical address (LA) indicating a logical page. The physical block address (PBA) may be a physical address (PA) indicating a physical page.

In an embodiment, logical block addresses respectively corresponding to the physical block addresses of the victim memory block that is the target of garbage collection may be a third logical block address (LBA3), a seventh logical block address (LBA7), and a second logical block address (LBA2). The third logical block address (LBA3), the seventh logical block address (LBA7), and the second logical block address (LBA2) may be logical block addresses assigned to the first core CORE1. Therefore, when the memory controller 200 performs garbage collection, the first core CORE1 may output the third logical block address (LBA3), the seventh logical block address (LBA7), and the second logical block address (LBA2) to the host interface

210. The host interface 210 may receive the logical block addresses in the sequence of the third logical block address (LBA3), the seventh logical block address (LBA7), and the second logical block address (LBA2) from the first core CORE1 (①).

The host interface 210 may receive the logical block addresses respectively corresponding to the physical block addresses of the victim memory block that is the target of garbage collection, and thereafter equally or evenly assign the logical block addresses to multiple cores included in the processor 230. That is, since the numbers of dies respectively coupled to the multiple cores included in the processor 230 are equal to each other, the host interface 210 may equally or evenly assign the logical block addresses to respective cores.

Therefore, after the third logical block address (LBA3), the seventh logical block address (LBA7), and the second logical block address (LBA2) have been received, the host interface 210 may sequentially assign the logical block addresses to the cores starting from the 0-th core CORE0. In an embodiment, the host interface 210 may assign the third logical block address (LBA3) to the 0-th core CORE0 which is a starting core on which the assignment of logical block addresses is initiated (②). After the third logical block address (LBA3) has been assigned to the 0-th core CORE0, the host interface 210 may assign the seventh logical block address (LBA7) to the first core CORE1 (③). After the seventh logical block address (LBA7) has been assigned to the first core CORE1, the host interface 210 may assign the second logical block address (LBA2) to the 0-th core CORE0 (②).

In other embodiments, after logical block addresses respectively corresponding to physical block addresses of a victim memory block that is the target of garbage collection have been received, the host interface 210 may receive a bitmap from the bitmap storage 220. The host interface 210 may determine the number of logical block addresses assigned to each of the multiple cores based on the bitmap. The host interface 210 may determine the number of logical block addresses assigned to each core, and thereafter assign the logical block addresses, respectively corresponding to the physical block addresses of the victim memory block on which garbage collection is to be performed, to any one of the multiple cores.

In detail, the host interface 210 may assign the logical block addresses to any one of the multiple cores according to an assignment ratio. The host interface 210 may determine the assignment ratio based on the number of memory devices coupled to each of the multiple cores, among the plurality of memory devices. Consequently, the host interface 210 may assign the logical block addresses, respectively corresponding to the physical block addresses of the victim memory block on which garbage collection is to be performed, to the multiple cores based on the number of logical block addresses assigned to each of the multiple cores.

In an embodiment, the bitmap storage 220 may store information about performance of garbage collection. That is, when the logical block addresses are assigned to the multiple cores, core information containing not only information about the cores, but also information indicating that garbage collection has been performed on the memory block, corresponding to the plurality of logical block addresses, may be generated. Therefore, the bitmap storage 220 may receive the core information and store bit values corresponding to the plurality of logical block addresses. The bit values corresponding to the plurality of logical block addresses may indicate logical block addresses at which garbage collection is performed.

Figure 14:
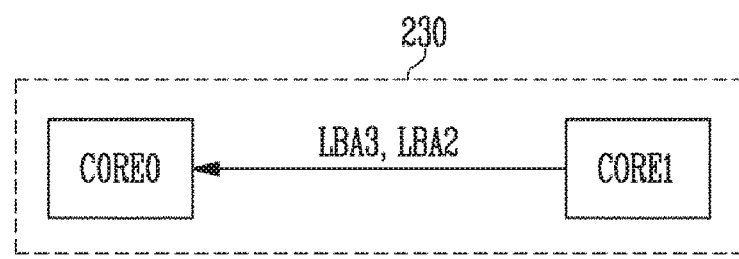
FIG. 14 is a diagram illustrating a method of outputting logical block addresses between multiple cores.

FIG. 14 is a diagram illustrating a method of outputting logical block addresses between multiple cores.

Referring to FIG. 14, a processor 230 may include a 0-th core CORE0 and a first core CORE1. Further, referring to FIGS. 13 and 14, logical block addresses respectively corresponding to the physical block addresses of a victim memory block that is the target of garbage collection (GC) may be a third logical block address (LBA3), a seventh logical block address (LBA7), and a second logical block address (LBA2). The third logical block address (LBA3), the seventh logical block address (LBA7), and the second logical block address (LBA2) may be logical block addresses assigned to the first core CORE1. Each logical block address (LBA) may be a logical address (LA) indicating a logical page. A physical block address (PBA) may be a physical address (PA) indicating a physical page.

In an embodiment, the 0-th and first cores CORE0 and CORE1 included in the processor 230 may exchange data with each other. Such a scheme is referred to as "inter-process communication (IPC)". Inter-process communication (IPC) denotes action of exchanging data with each other between processes or a method or a path for the action.

Therefore, after the third logical block address (LBA3), the seventh logical block address (LBA7), and the second logical block address (LBA2) have been output to the host interface 210, the third logical block address (LBA3) and the second logical block address (LBA2) may be assigned to the 0-th core CORE0, and the seventh logical block address (LBA7) may be assigned to the first core CORE1, but the first core CORE1 may directly output the third logical block address (LBA3) and the second logical block address (LBA2) to the 0-th core CORE0. That is, the first core CORE1 may directly output the third logical block address (LBA3) and the second logical block address (LBA2) to the 0-the core CORE0 via inter-process communication (IPC), without needing to output logical block addresses to be reassigned to the host interface 210.

FIGS. 15A and 15B are diagrams illustrating a bitmap stored in a bitmap storage before garbage collection is performed and after garbage collection has been performed, respectively.

Referring to FIGS. 15A and 15B, FIG. 15A illustrates the bitmap stored in the bitmap storage 220 before garbage collection (GC) is performed, and FIG. 15B illustrates the bitmap stored in the bitmap storage 220 after garbage collection has been performed. In FIGS. 15A and 15B, the number of cores included in a processor 230 is 2 and the numbers of dies coupled to respective cores are equal to each other.

Referring to FIGS. 15A and 15B, a first row indicates logical block addresses received from a host 300. A second row indicates a bitmap including bit values corresponding to respective logical block addresses. Of the bit values included in the bitmap, "0" is exemplified to indicate that a logical block address is assigned to a 0-th core CORE0. Also, of the bit values included in the bitmap, "1" is exemplified to indicate that a logical block address is assigned to the first core CORE1. The bit values included in the bitmap may be set depending on the number of multiple cores included in the processor 230. That is, when each bit value is set to "0" or "1", the number of cores included in the processor 230 may be 2.

Referring to FIGS. 13 to 15A and 15B, logical block addresses respectively corresponding to the physical block addresses of a victim memory block that is the target of garbage collection may be a third logical block address (LBA3), a seventh logical block address (LBA7), and a second logical block address (LBA2).

FIG. 15A illustrates the bitmap before garbage collection is performed. Before garbage collection is performed, the host interface 210 may sequentially receive a fifth logical block address (LBA5), a third logical block address (LBA3), a first logical block address (LBA1), a seventh logical block address (LBA7), a sixth logical block address (LBA6), and a second logical block address (LBA2) from the host 300. Therefore, the host interface 210 may assign the fifth logical block address (LBA5), the first logical block address (LBA1), and the sixth logical block address (LBA6) to the 0-th core CORE0, and may assign the third logical block address (LBA3), the seventh logical block address (LBA7), and the second logical block address (LBA2) to the first core CORE1.

In an embodiment, before garbage collection is performed, the bitmap storage 220 may store the bitmap including the bit values corresponding to respective logical block addresses. In detail, the bit values corresponding to the fifth logical block address (LBA5), the first logical block address (LBA1), and the sixth logical block address (LBA6) may be "0". The bit values corresponding to the third logical block address (LBA3), the seventh logical block address (LBA7), and the second logical block address (LBA2) may be "1".

FIG. 15B illustrates the bitmap after garbage collection has been performed. Logical block addresses respectively corresponding to the physical block addresses of the victim memory block that is the target of garbage collection may be a third logical block address (LBA3), a seventh logical block address (LBA7), and a second logical block address (LBA2). The third logical block address (LBA3), the seventh logical block address (LBA7), and the second logical block address (LBA2) may be logical block addresses assigned to the first core CORE1. Therefore, when the memory controller 200 performs garbage collection, the first core CORE1 may output the third logical block address (LBA3), the seventh logical block address (LBA7), and the second logical block address (LBA2) to the host interface 210.

The host interface 210 may receive the logical block addresses respectively corresponding to the physical block addresses of the victim memory block that is the target of garbage collection, and thereafter evenly assign the logical block addresses to multiple cores included in the processor 230. That is, since the numbers of dies respectively coupled to the multiple cores included in the processor 230 are equal to each other, the host interface 210 may evenly assign the logical block addresses to respective cores.

Therefore, after the third logical block address (LBA3), the seventh logical block address (LBA7), and the second logical block address (LBA2) have been received, the host interface 210 may sequentially assign the logical block addresses to the cores starting from the 0-th core CORE0. Consequently, after the third logical block address (LBA3) has been assigned to the 0-th core CORE0, the host interface 210 may assign the seventh logical block address (LBA7) to the first core CORE1. After the seventh logical block address (LBA7) has been assigned to the first core CORE1, the host interface 210 may assign the second logical block address (LBA2) to the 0-th core CORE0.

The logical block addresses respectively corresponding to the physical block addresses of the victim memory block that is the target of garbage collection are assigned to the 0-th and first cores CORE0 and CORE1, and thus bit values corresponding to the third and second logical block addresses (LBA3 and LBA2) may be changed to "0". Since the seventh logical block address (LBA7) is reassigned to the first core CORE1, the bit value corresponding to the seventh logical block address (LBA7) may be maintained at "1".

Figure 16:
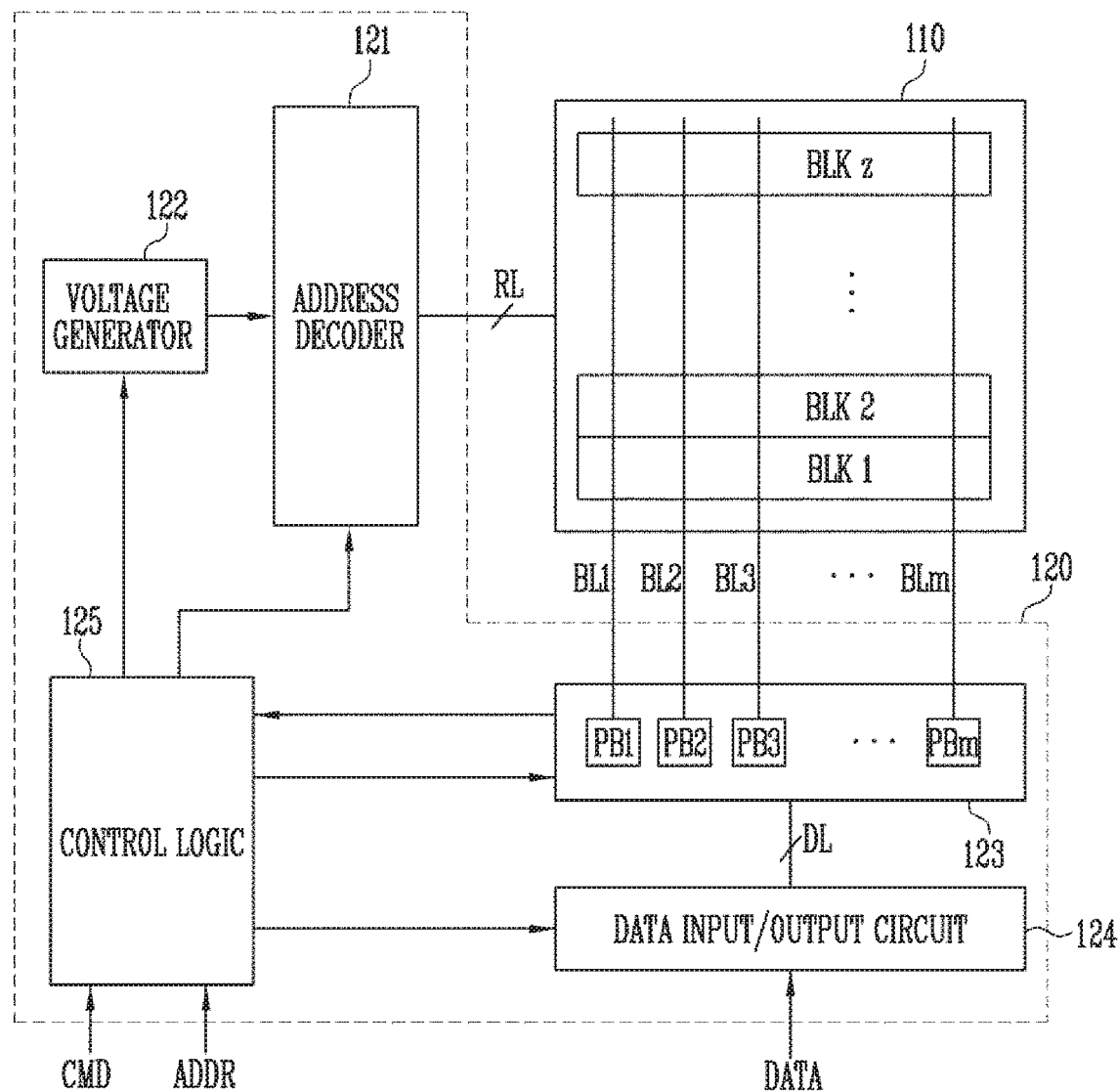
FIG. 16 is a block diagram illustrating a structure of a memory device of FIG. 1.

FIG. 16 is a block diagram illustrating a structure of the memory device of FIG. 1.

Referring to FIG. 16, a memory device 100 may include a memory cell array 110 and, a peripheral circuit 120.

The memory cell array 110 includes a plurality of memory blocks BLK1 to BLKz. The memory blocks BLK1 to BLKz are coupled to an address decoder 121 through row lines RL and are coupled to a read and write circuit 123 through bit lines BL1 to BLm. Each of the memory blocks BLK1 to BLKz includes a plurality of memory cells. In an embodiment, the plurality of memory cells may be nonvolatile memory cells.

The memory cells included in the memory cell array 110 may be divided into a plurality of blocks according to the usage purpose thereof. System information corresponding to various types of setting information required to control the memory device 100 may be stored in the plurality of blocks.

Each of the first to z-th memory blocks BLK1 to BLKz includes a plurality of cell strings. First to m-th cell strings are respectively coupled to the first to m-th bit lines BL1 to BLm. Each of the first to m-th cell strings includes a drain select transistor, a plurality of series-coupled memory cells, and a source select transistor. The drain select transistor DST is coupled to a drain select line DSL. First to n-th memory cells are respectively coupled to first to n-th word lines WL1 to WLn. The source select transistor SST is coupled to a source select line SSL. A drain of the drain select transistor DST is coupled to the corresponding bit line. The drain select transistors of the first to m-th cell strings are respectively coupled to the first to m-th bit lines BL1 to BLm. A source of the source select transistor SST is coupled to a common source line CSL. In an embodiment, the common source line CSL may be coupled in common to the first to z-th memory blocks BLK1 to BLKz. The drain select line DSL, the first to n-th word lines WL1 to WLn, and the source select line SSL are included in the row lines RL. The drain select line DSL, the first to n-th word lines WL1 to WLn, and the source select line SSL are controlled by the address decoder 121. The common source line CSL is controlled by the control logic 125. The first to m-th bit lines BL1 to BLm are controlled by the read and write circuit 123.

The peripheral circuit 120 may include the address decoder 121, a voltage generator 122, the read and write circuit 123, a data input/output circuit 124, and the control logic 125.

The address decoder 121 is coupled to the memory cell array 110 through the row lines RL. The address decoder 121 may be operated under the control of the control logic 125. The address decoder 121 receives addresses ADDR through the control logic 125.

In an embodiment, the program operation and the read operation of the memory device 100 are each performed on a page basis.

During the program and read operations, the addresses ADDR received by the control logic 125 may include a block address and a row address. The address decoder 121 may decode the block address among the received addresses ADDR. The address decoder 121 selects one of the memory blocks BLK1 to BLKz in response to the decoded block address.

The address decoder 121 may decode the row address among the received addresses ADDR. In response to the decoded row address, the address decoder 121 applies voltages, provided from the voltage generator 122, to the row lines RL and then selects one word line of the selected memory block.

During an erase operation, the addresses ADDR include a block address. The address decoder 121 may decode the block address and select one memory block in response to the decoded block address. An erase operation may be performed on all or part of one memory block.

During a partial erase operation, the addresses ADDR may include block and row addresses. The address decoder 121 selects one of the memory blocks BLK1 to BLKz in response to the decoded block address.

The address decoder 121 may decode the row addresses among the received addresses ADDR. In response to the decoded row addresses, the address decoder 121 applies voltages, provided from the voltage generator 122, to the row lines RL and then selects at least one word line of the selected memory block.

In an embodiment, the address decoder 121 may include a block decoder, a word line decoder, and an address buffer.

The voltage generator 122 may generate a plurality of voltages using an external supply voltage provided to the memory device 100. The voltage generator 122 is operated under the control of the control logic 125.

In an embodiment, the voltage generator 122 may generate an internal supply voltage by regulating the external supply voltage. The internal supply voltage generated by the voltage generator 122 is used as an operating voltage for the memory device 100.

In an embodiment, the voltage generator 122 may generate a plurality of voltages using the external supply voltage or the internal supply voltage. For example, the voltage generator 122 may include a plurality of pumping capacitors for receiving the internal supply voltage, and may generate a plurality of voltages by selectively enabling the plurality of pumping capacitors under the control of the control logic 125. The generated voltages are applied to word lines selected by the address decoder 121.

During a program operation, the voltage generator 122 may generate a high-voltage program pulse and a pass pulse lower than the program pulse. During a read operation, the voltage generator 122 may generate a read voltage and a pass voltage higher than the read voltage. During an erase operation, the voltage generator 122 may generate an erase voltage.

The read and write circuit 123 includes first to m-th page buffers PB1 to PBm coupled to the memory cell array 110 through the first to m-th bit lines BL1 to BLm, respectively. The first to m-th page buffers PB1 to PBm are operated under the control of the control logic 125.

The first to m-th page buffers PB1 to PBm perform data communication with the data input/output circuit 124. During a program operation, the first to m-th page buffers PB1 to PBm receive data to be stored DATA through the data input/output circuit 124 and data lines DL.

During a program operation, the first to m-th page buffers PB1 to PBm may transfer the data, received through the data input/output circuit 124, to selected memory cells through the bit lines BL1 to BLm when a program pulse is applied to each selected word line. The memory cells in the selected page are programmed based on the transferred data. Memory cells coupled to a bit line to which a program permission voltage (e.g., a ground voltage) is applied may have increased threshold voltages. Threshold voltages of memory cells coupled to a bit line to which a program inhibition voltage (e.g., a supply voltage) is applied may be maintained. During a program verify operation, the first to m-th page buffers may read page data from the selected memory cells through the bit lines BL1 to BLm.

During a read operation, the read and write circuit 123 may read data from the memory cells in the selected page through the bit lines BL, and may output the read data to the data input/output circuit 124. During an erase operation, the read and write circuit 123 may allow the bit lines BL to float.

In an embodiment, the read and write circuit 123 may include a column select circuit.

The data input/output circuit 124 is coupled to the first to m-th page buffers PB1 to PBm through the data lines DL. The data input/output circuit 124 is operated in response to the control of the control logic 125. During a program operation, the data input/output circuit 124 receives data DATA to be stored from an external controller (not illustrated).

The control logic 125 is coupled to the address decoder 121, the voltage generator 122, the read and write circuit 123, and the data input/output circuit 124. The control logic 125 may control the overall operation of the memory device 100. The control logic 125 receives a command CMD and addresses ADDR from the external controller. The control logic 125 may control the address decoder 121, the voltage generator 122, the read and write circuit 123, and the data input/output circuit 124 in response to the command CMD.

Figure 17:
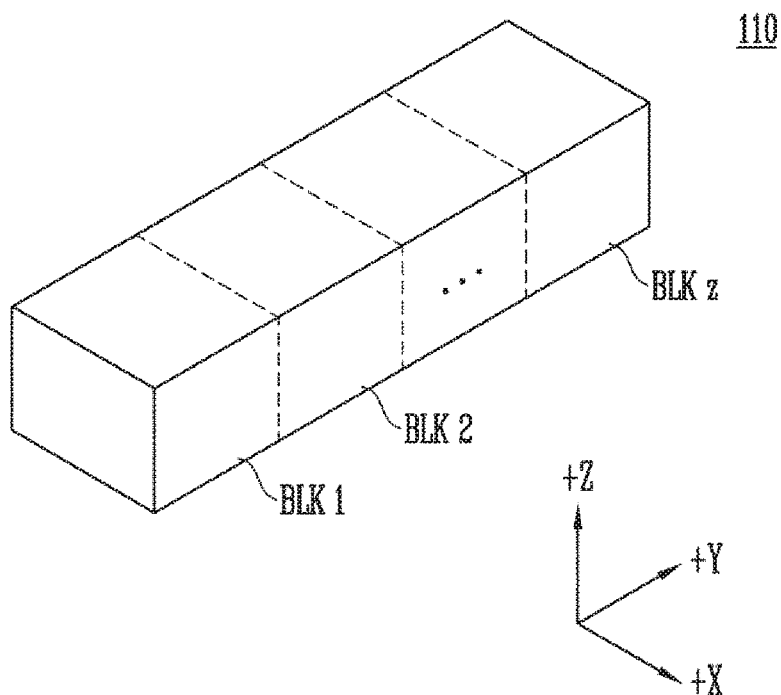
FIG. 17 is a diagram illustrating an embodiment of a memory cell array of FIG. 16.

FIG. 17 is a diagram illustrating an embodiment of the memory cell array of FIG. 16.

Referring to FIG. 17, the memory cell array 110 includes a plurality of memory blocks BLK1 to BLKz. Each memory block may have a three-dimensional (3D) structure. Each memory block includes a plurality of memory cells stacked on a substrate. Such memory cells are arranged in a positive X (+X) direction, a positive Y (+Y) direction, and a positive Z (+Z) direction. The structure of each memory block is described in detail below with reference to FIGS. 18 and 19.

Figure 18:
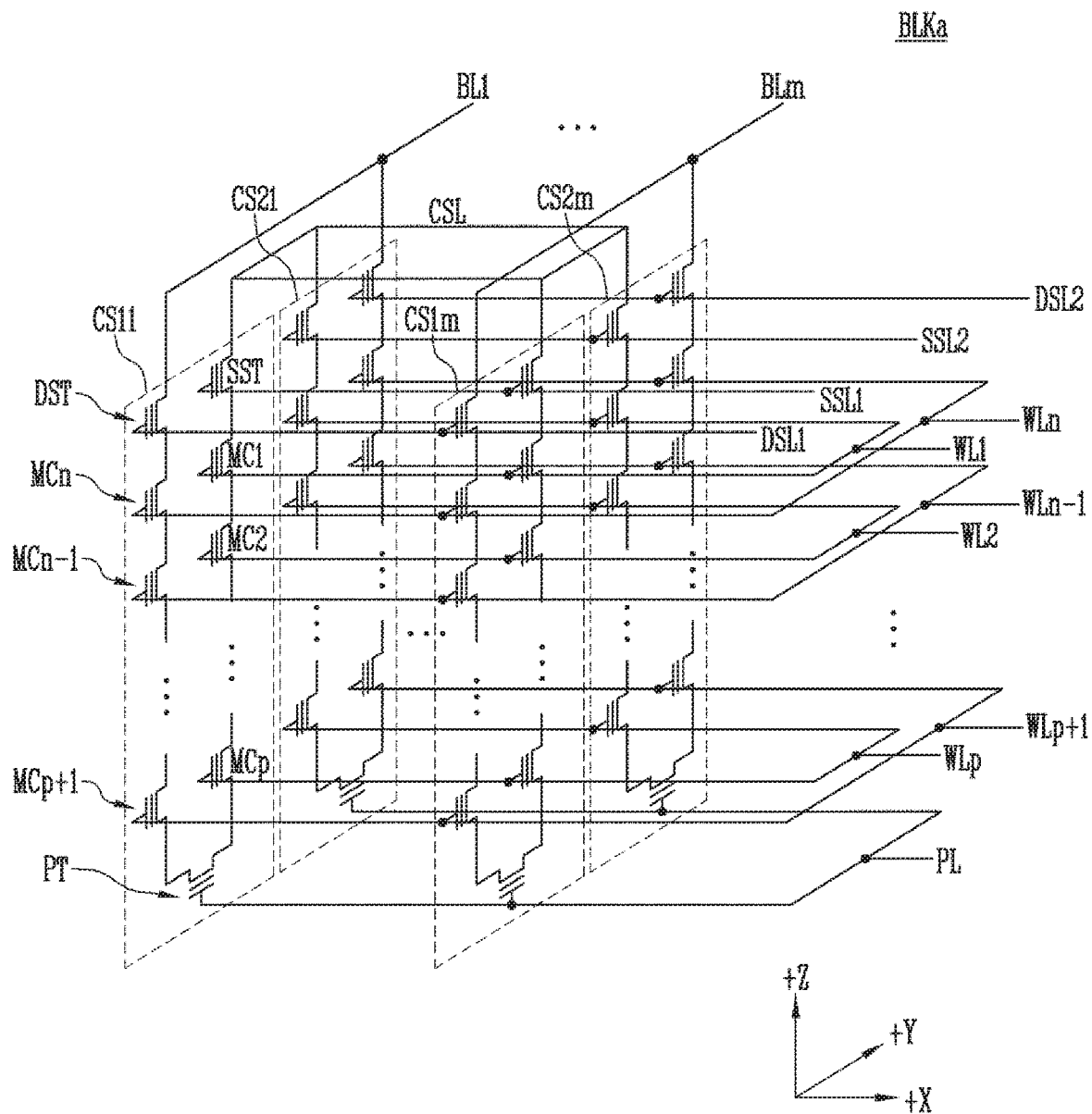
FIG. 18 is a circuit diagram illustrating an example of any one memory block BLKa of memory blocks BLK1 to BLKz of FIG. 17.

FIG. 18 is a circuit diagram illustrating any one memory block BLKa of the memory blocks BLK1 to BLKz of FIG. 17.

Referring to FIG. 18, the memory block BLKa includes a plurality of cell strings CS11 to CS1m and CS21 to CS2m. In an embodiment, each of the cell strings CS11 to CS1m and CS21 to CS2m may be formed in a 'U' shape. In the memory block BLKa, m cell strings are arranged in a row direction (i.e. a positive (+) X direction). In FIG. 18, two cell strings are illustrated as being arranged in a column direction (i.e. a positive (+) Y direction). However, this illustration is made for clarity; it will be understood that three or more cell strings may be arranged in the column direction.

Each of the plurality of cell strings CS11 to CS1m and CS21 to CS2m includes at least one source select transistor SST, first to n-th memory cells MC1 to MCn, a pipe transistor PT, and at least one drain select transistor DST.

The select transistors SST and DST and the memory cells MC1 to MCn may have similar structures, respectively. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided to each cell string. In an embodiment, a pillar for providing at least one of the channel layer, the tunneling insulating layer, the charge storage layer, and the blocking insulating layer may be provided to each cell string.

The source select transistor SST of each cell string is connected between the common source line CSL and memory cells MC1 to MCp.

In an embodiment, the source select transistors of cell strings arranged in the same row are coupled to a source select line extending in a row direction, and source select transistors of cell strings arranged in different rows are coupled to different source select lines. In FIG. 18, source select transistors of cell strings CS11 to CS1*m* in a first row are coupled to a first source select line SSL1. The source select transistors of cell strings CS21 to CS2*m* in a second row are coupled to a second source select line SSL2.

In an embodiment, source select transistors of the cell strings CS11 to CS1*m* and CS21 to CS2*m* may be coupled in common to a single source select line.

The first to n-th memory cells MC1 to MCn in each cell string are coupled between the source select transistor SST and the drain select transistor DST.

The first to n-th memory cells MC1 to MCn may be divided into first to p-th memory cells MC1 to MCp and p+1-th to n-th memory cells MCp+1 to MCn. The first to p-th memory cells MC1 to MCp are sequentially arranged in a negative (−)Z direction and are connected in series between the source select transistor SST and the pipe transistor PT. The p+1-th to n-th memory cells MCp+1 to MCn are sequentially arranged in the +Z direction and are connected in series between the pipe transistor PT and the drain select transistor DST. The first to p-th memory cells MC1 to MCp and the p+1-th to n-th memory cells MCp+1 to MCn are coupled to each other through the pipe transistor PT. The gates of the first to n-th memory cells MC1 to MCn of each cell string are coupled to first to n-th word lines WL1 to WLn, respectively.

A gate of the pipe transistor PT of each cell string is coupled to a pipeline PL.

The drain select transistor DST of each cell string is connected between the corresponding bit line and the memory cells MCp+1 to MCn. The cell strings in a row direction are coupled to drain select lines extending in a row direction. Drain select transistors of cell strings CS11 to CS1*m* in the first row are coupled to a first drain select line DSL1. Drain select transistors of cell strings CS21 to CS2*m* in a second row are coupled to a second drain select line DSL2.

Cell strings arranged in a column direction are coupled to bit lines extending in a column direction. In FIG. 18, cell strings CS11 and CS21 in a first column are coupled to a first bit line BL1. Cell strings CS1*m* and CS2*m* in an m-th column are coupled to an m-th bit line BLm.

The memory cells coupled to the same word line in cell strings arranged in a row direction constitute a single page. For example, memory cells coupled to the first word line WL1, among the cell strings CS11 to CS1*m* in the first row, constitute a single page. Memory cells coupled to the first word line WL1, among the cell strings CS21 to CS2*m* in the second row, constitute a single additional page. Cell strings arranged in the direction of a single row may be selected by selecting any one of the drain select lines DSL1 and DSL2. A single page may be selected from the selected cell strings by selecting any one of the word lines WL1 to WLn.

In an embodiment, even bit lines and odd bit lines, instead of first to m-th bit lines BL1 to BLm, may be provided. Further, even-numbered cell strings, among the cell strings CS11 to CS1*m* or CS21 to CS2*m* arranged in a row direction, may be coupled to the even bit lines, respectively, and odd-numbered cell strings, among the cell strings CS11 to CS1*m* or CS21 to CS2*m* arranged in the row direction, may be coupled to the odd bit lines, respectively.

In an embodiment, one or more of the first to n-th memory cells MC1 to MCn may be used as dummy memory cells. For example, one or more dummy memory cells are provided to reduce an electric field between the source select transistor SST and the memory cells MC1 to MCp. Alternatively, the dummy memory cell(s) are provided to reduce an electric field between the drain select transistor DST and the memory cells MCp+1 to MCn. As more dummy memory cells are provided, the reliability of the operation of the memory block BLKa is improved, but the size of the memory block BLKa is increased. As fewer dummy memory cells are provided, the size of the memory block BLKa is reduced, but the reliability of the operation of the memory block BLKa may be deteriorated.

In order to efficiently control the dummy memory cell(s), each of the dummy memory cells may have a required threshold voltage. Before or after the erase operation of the memory block BLKa is performed, a program operation may be performed on all or some of the dummy memory cells. When an erase operation is performed after the program operation has been performed, the voltages that are applied to the dummy word lines coupled to respective dummy memory cells are controlled, and thus the dummy memory cells may have required threshold voltages.

Figure 19:
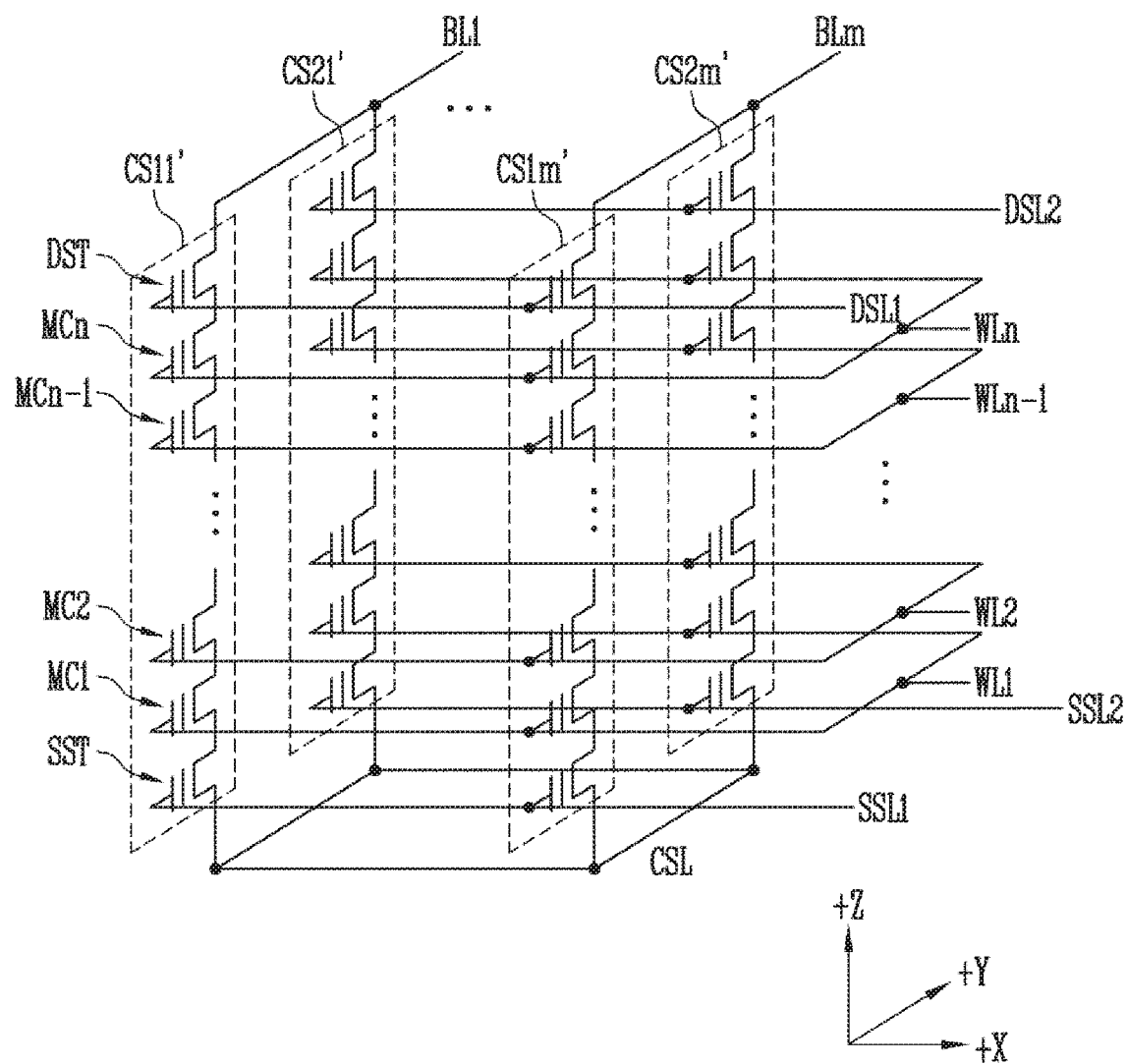
FIG. 19 is a circuit diagram illustrating an example of any one memory block BLKb of the memory blocks BLK1 to BLKz of FIG. 17.

FIG. 19 is a circuit diagram illustrating an example of any one memory block BLKb of the memory blocks BLK1 to BLKz of FIG. 17.

Referring to FIG. 19, the memory block BLKb includes a plurality of cell strings CS11' to CS1*m*' and CS21' to CS2*m*'. Each of the plurality of cell strings CS11' to CS1*m*' and CS21' to CS2*m*' extends in a positive Z (+Z) direction. Each of the cell strings CS11' to CS1*m*' and CS21' to CS2*m*' includes at least one source select transistor SST, first to n-th memory cells MC1 to MCn, and at least one drain select transistor DST, which are stacked on a substrate (not illustrated) below the memory block BLKb.

The source select transistor SST of each cell string is connected between a common source line CSL and memory cells MC1 to MCn. The source select transistors of cell strings arranged in the same row are coupled to the same source select line. Source select transistors of cell strings CS11' to CS1*m*' arranged in a first row are coupled to a first source select line SSL1. Source select transistors of cell strings CS21' to CS2*m*' arranged in a second row are coupled to a second source select line SSL2. In an embodiment, source select transistors of the cell strings CS11' to CS1*m*' and CS21' to CS2*m*' may be coupled in common to a single source select line.

The first to n-th memory cells MC1 to MCn in each cell string are connected in series between the source select transistor SST and the drain select transistor DST. The gates of the first to n-th memory cells MC1 to MCn are coupled to first to n-th word lines WL1 to WLn, respectively.

The drain select transistor DST of each cell string is connected between the corresponding bit line and the memory cells MC1 to MCn. Drain select transistors of cell strings arranged in a row direction are coupled to drain select lines extending in a row direction. The drain select transistors of the cell strings CS11' to CS1*m*' in the first row are coupled to a first drain select line DSL1. The drain select transistors of the cell strings CS21' to CS2*m*' in the second row are coupled to a second drain select line DSL2.

As a result, the memory block BLKb of FIG. 19 has an equivalent circuit similar to that of the memory block BLKa of FIG. 18 except that a pipe transistor PT is excluded from each cell string.

In an embodiment, even bit lines and odd bit lines, instead of first to m-th bit lines BL1 to BLm, may be provided. Further, even-numbered cell strings, among the cell strings CS11' to CS1m' or CS21' to CS2m' arranged in a row direction, may be coupled to the even bit lines, respectively, and odd-numbered cell strings, among the cell strings CS11' to CS1m' or CS21' to CS2m' arranged in the row direction, may be coupled to the odd bit lines, respectively.

In an embodiment, one or more of the first to n-th memory cells MC1 to MCn may be used as dummy memory cells. For example, one or more dummy memory cells are provided to reduce an electric field between the source select transistor SST and the memory cells MC1 to MCn. Alternatively, the dummy memory cell(s) are provided to reduce an electric field between the drain select transistor DST and the memory cells MC1 to MCn. As more dummy memory cells are provided, the reliability of the operation of the memory block BLKb is improved, but the size of the memory block BLKb is increased. As fewer dummy memory cells are provided, the size of the memory block BLKb is reduced, but the reliability of the operation of the memory block BLKb may be deteriorated.

In order to efficiently control the dummy memory cell(s), each of the dummy memory cells may have a required threshold voltage. Before or after the erase operation of the memory block BLKb is performed, a program operation may be performed on all or some of the dummy memory cells. When an erase operation is performed after the program operation has been performed, the voltages that are applied to the dummy word lines coupled to respective dummy memory cells are controlled, and thus the dummy memory cells may have required threshold voltages.

Figure 20:
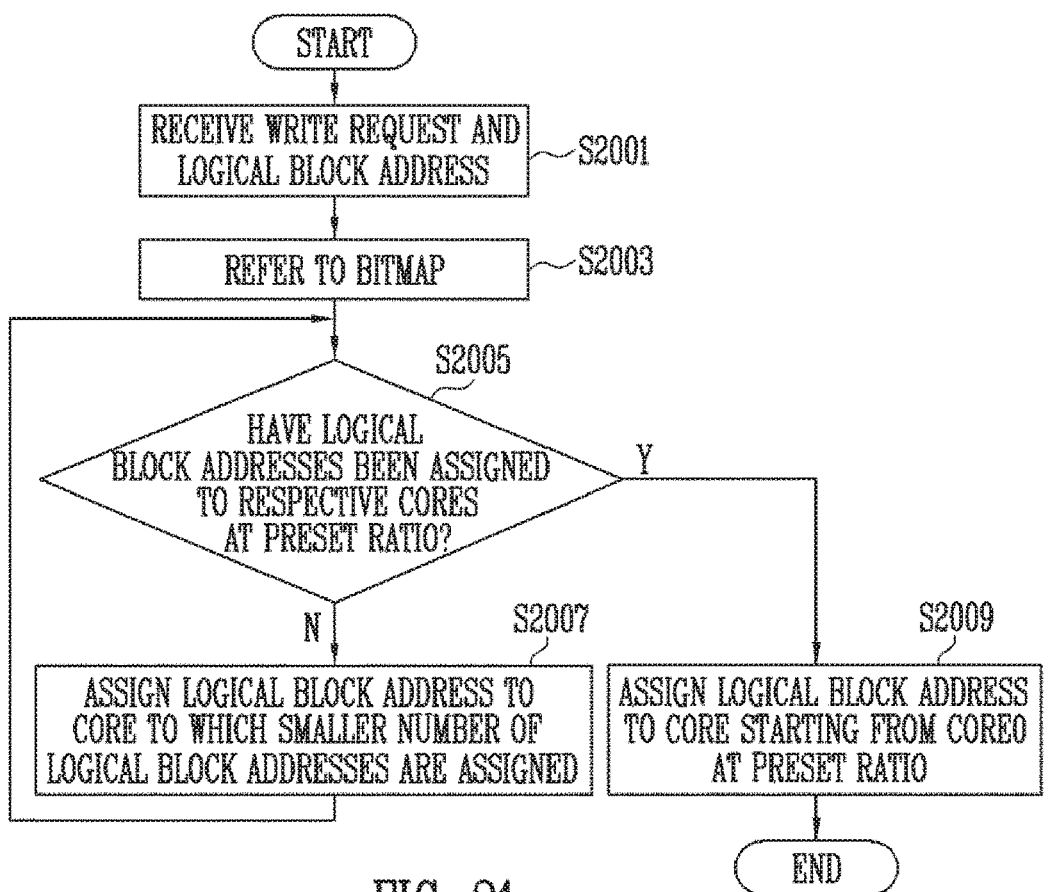
FIG. 20 is a diagram illustrating operation of a memory controller according to an embodiment of the present disclosure.

FIG. 20 is a diagram illustrating the operation of a memory controller according to an embodiment of the present disclosure.

Referring to FIG. 20, at step S2001, a host interface 210 may receive a write request WRITE_REQ and a logical block address (LBA) from a host 300. The logical block address may be an address corresponding to the write request WRITE_REQ. After the write request WRITE_REQ and the logical block address (LBA) have been received from the host 300, the host interface 210 may perform an operation corresponding to the request received from the host 300.

At step S2003, the host interface 210 may refer to a bitmap stored in a bitmap storage 220. The host interface 210 may refer to the bitmap so as to assign the logical block address received from the host 300. The host interface 210 may assign the logical block address received from the host 300 to any one of multiple cores included in the processor 230 based on the result of reference to the bitmap.

At step S2005, the host interface 210 may determine whether logical block addresses have been assigned to respective cores at a preset ratio. In detail, the host interface 210 may determine a state in which logical block addresses are assigned to the multiple cores included in the processor 230 based on the result of reference to the bitmap. The ratio may be determined based on capacities of one or more memory devices (e.g., the number of one or more memory devices) coupled to each of the multiple cores included in the processor 230. The number of logical block addresses to be assigned to each of the multiple cores included in the processor 230 may be determined depending on the numbers of different bit values included in the bitmap.

When the logical block addresses are not assigned to respective cores at the preset ratio, the process proceeds to step S2007. When the logical block addresses are assigned to respective cores at the preset ratio, the process proceeds to step S2009.

At step S2007, the host interface 210 may assign the corresponding logical block address to a core to which a smaller number of logical block addresses are assigned. In detail, logical block addresses that have been received before the corresponding logical block address is received from the host 300 may not be evenly assigned or equally distributed to the multiple cores. In this case, the host interface 210 may assign the logical block address to the core to which a smaller number of logical block addresses are assigned, among the multiple cores, with reference to the bitmap.

After the host interface 210 has assigned the logical block address, the process may return to step S2005. Therefore, the host interface 210 may assign a next logical block address to any one of the multiple cores with reference to the bitmap. That is, until the logical block addresses are equally or evenly assigned to the multiple cores, the host interface may assign each logical block address to a core to which a smaller number of logical block addresses are assigned.

At step S2009, the host interface 210 may assign the logical block address received from the host 300 to a core starting from the 0-th core CORE0 at the preset ratio. That is, a plurality of logical block addresses that have been received before the corresponding logical block address is received from the host 300 may have been evenly assigned to the multiple cores such that the numbers of the logical block addresses previously assigned to the multiple cores become to have the preset ratio. In this case, the assignment of logical block addresses may resume from the 0-th core CORE0 on which the assignment of logical block addresses is initiated. The 0-th core CORE0 may be a starting core on which the assignment of logical block addresses is initiated.

Thereafter, the host interface may assign each logical block address received from the host to any one of the multiple cores according to the assignment ratio. Therefore, the host interface 210 may assign the corresponding logical block address to any one of the multiple cores depending on the assignment ratio regardless of whether the logical block address is an even address (Even LBA) or an odd address (Odd LBA).

Figure 21:
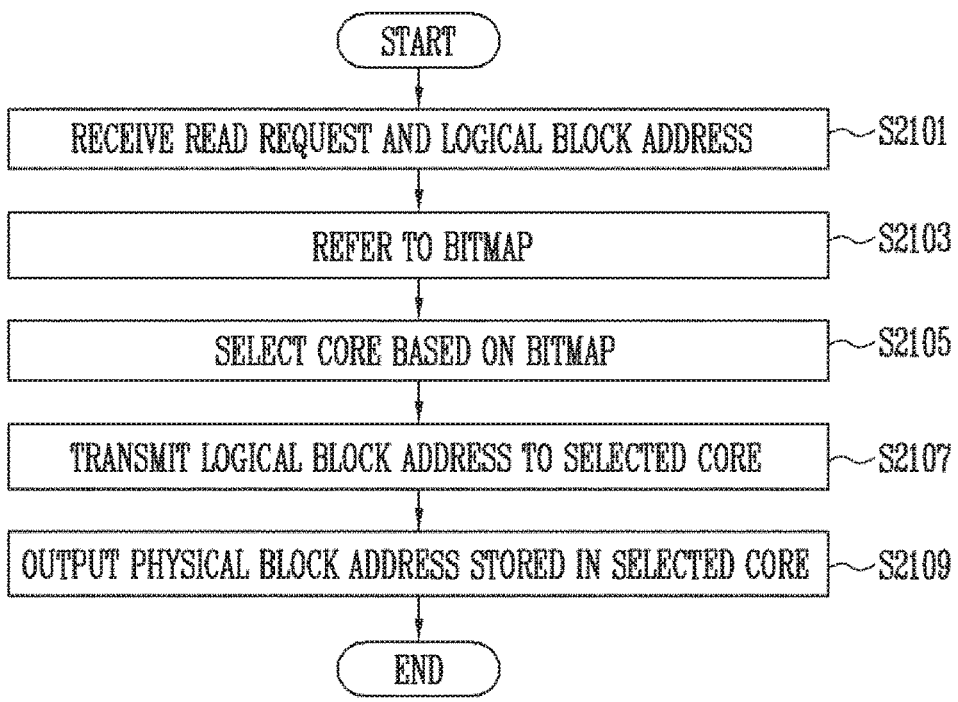
FIG. 21 is a diagram illustrating operation of a memory controller according to an embodiment of the present disclosure.

FIG. 21 is a diagram illustrating the operation of a memory controller according to an embodiment of the present disclosure.

Referring to FIG. 21, at step S2101, a host interface 210 may receive a read request READ_REQ and a logical block address (LBA) from a host 300. The logical block address may be an address corresponding to the read request READ_REQ. After the read request READ_REQ and the logical block address (LBA) have been received from the host 300, the host interface 210 may perform an operation corresponding to the request received from the host 300.

At step S2103, the host interface 210 may refer to a bitmap stored in a bitmap storage 220. The host interface 210 may refer to the bitmap so as to output a physical block address having a mapping relationship with the logical block address received from the host 300 to a memory device. The physical block address (PBA) may be a physical address (PA) indicating a physical page.

At step S2105, the host interface 210 may select any one core from among multiple cores based on the bitmap. In detail, the host interface 210 may assign the logical block address received from the host 300 to any one core selected from among the multiple cores included in the processor 230 based on the result of reference to the bitmap.

In an embodiment, the host interface 210 may determine, based on the bitmap, a core to which the logical block address received from the host 300 is to be assigned. That is, the host interface 210 may determine, based on the bitmap, the core to which the logical block address is to be assigned, among the multiple cores included in the processor 230. The core to which the logical block address is to be assigned may be determined based on the bit values included in the bitmap.

At step S2107, the host interface 210 may transmit the logical block address received from the host 300 to the selected core. In detail, the host interface 210 may determine the core to which the logical block address received from the host 300 is to be assigned, and may output the logical block address to the corresponding core. That is, the host interface 210 may output the logical block address to the core to which the logical block address is determined to be assigned, among the multiple cores included in the processor 230.

At step S2109, the physical block address stored in the core selected from among the multiple cores included in the processor 230 may be output. In detail, the processor 230 may receive the logical block address from the host interface 210. The processor 230 may assign the logical block address to the core determined by the host interface 210. Mapping information related to the logical block address received from the host 300 may be stored in the core determined by the host interface 210.

The processor 230 may receive the logical block address (LBA) from the host interface 210, and may output a physical block address (PBA) having a mapping relationship with the corresponding logical block address to the memory interface 240. The physical block address (PBA) may indicate the location of a memory block included in any one of a plurality of memory devices. Alternatively, the physical block address (PBA) may indicate the location of any one of a plurality of dies included in a single memory device 100.

Figure 22:
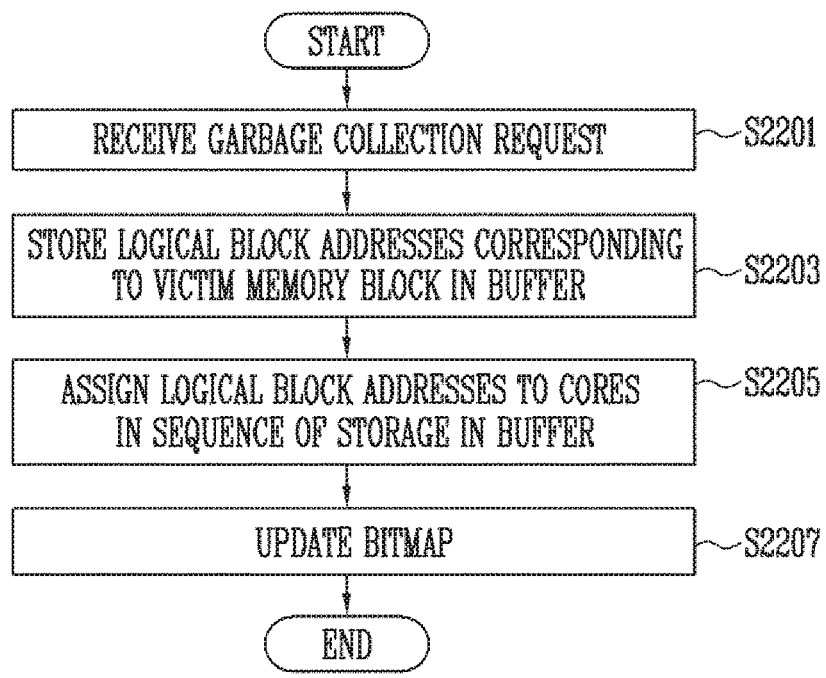
FIG. 22 is a diagram illustrating operation of a memory controller according to an embodiment of the present disclosure.

FIG. 22 is a diagram illustrating the operation of a memory controller according to an embodiment of the present disclosure.

Referring to FIG. 22, at step S2201, a host interface 210 may receive a garbage collection request from a host 300. The host interface may perform an operation corresponding to the garbage collection request. The garbage collection request may be received from the host depending on the number of free blocks or reserved blocks, among memory blocks included in the memory device. Garbage collection may be an operation of securing the number of free blocks.

At step S2203, the host interface 210 may store logical block addresses, respectively corresponding to the physical block addresses of a victim memory block, in a buffer. The host interface 210 may include the buffer. The victim memory block may be a memory block in which there are a smaller number of valid pages, among a plurality of memory blocks included in the memory device. That is, the victim memory block may be a memory block which is changed to a free block through garbage collection.

In an embodiment, the host interface 210 may sequentially receive the logical block addresses respectively corresponding to the physical block addresses of the victim memory block on which garbage collection is to be performed. The host interface 210 may store the logical block addresses in the buffer.

At step S2205, the host interface 210 may assign the logical block addresses to the cores in a sequence in which the logical block addresses are stored in the buffer. The host interface 210 may receive the logical block addresses respectively corresponding to the physical block addresses of the victim memory block that is the target of garbage collection and store the received logical block addresses in the buffer, and may thereafter evenly assign the stored logical block addresses to the multiple cores, respectively, in the sequence of storage of the logical block addresses.

In a case that the numbers of dies coupled to respective cores through a memory interface 240 are different from each other, the host interface 210 may assign the stored logical block addresses to the multiple cores such that the numbers of logical block addresses assigned to the multiple cores may have the assignment ratio, that is, the ratio of the numbers of memory devices, as described above with reference to FIGS. 7, 11A, 11B and 13.

At step S2207, the bitmap storage 220 may receive core information CORE_INF from the host interface 210 and then update the bitmap. In an embodiment, when the core to which the logical block address is to be assigned is determined among the multiple cores, the host interface 210 may output core information CORE_INF about the core to which the logical block address is to be assigned, to the bitmap storage 220. The bitmap storage 220 may change bit values included in the bitmap based on the core information CORE_INF. The core information CORE_INF may include information about the core to which the logical block address is assigned.

Figure 23:
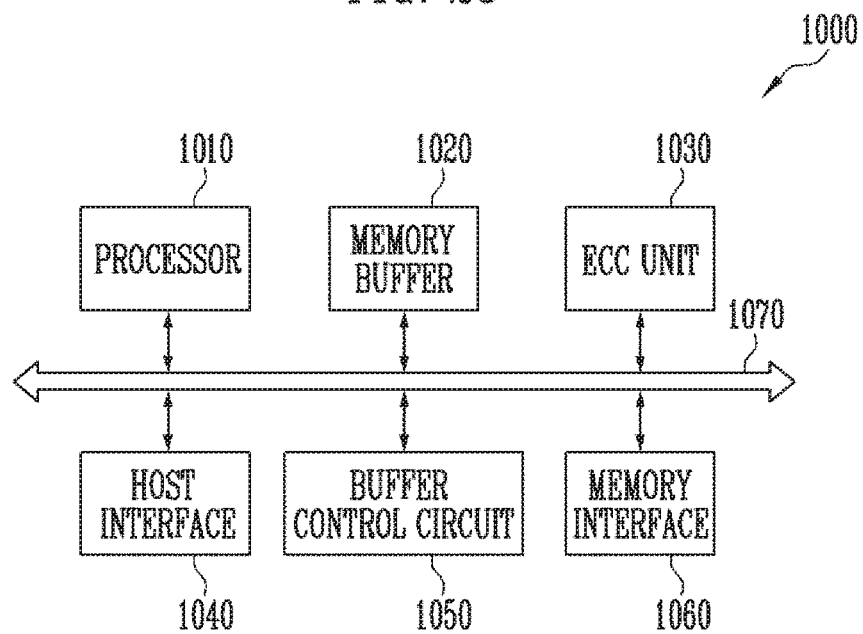
FIG. 23 is a diagram illustrating an embodiment of a memory controller of FIG. 1.

FIG. 23 is a diagram illustrating an embodiment of the memory controller of FIG. 1.

A memory controller 1000 is coupled to a host and a memory device. In response to a request received from the host, the memory controller 1000 may access the memory device. For example, the memory controller 1000 may be configured to control write, read, erase, and background operations of the memory device. The memory controller 1000 may provide an interface between the memory device and the host. The memory controller 1000 may run firmware for controlling the memory device.

Referring to FIG. 23, the memory controller 1000 may include a processor 1010, a memory buffer 1020, an error correction code (ECC) unit 1030, a host interface 1040, a buffer control circuit 1050, a memory interface 1060, and a bus 1070.

The bus 1070 may provide channels between components of the memory controller 1000.

The processor 1010 may control the overall operation of the memory controller 1000 and may perform a logical operation. The processor 1010 may communicate with an external host through the host interface 1040 and also communicate with the memory device through the memory interface 1060. Further, the processor 1010 may communicate with the memory buffer 1020 through the buffer control circuit 1050. The processor 1010 may control the operation of the storage device by using the memory buffer 1020 as a working memory, a cache memory or a buffer memory.

The processor 1010 may perform the function of a flash translation layer (FTL). The processor 1010 may translate a logical block address (LBA), provided by the host, into a physical block address (PBA) through the FTL. The FTL may receive the LBA using a mapping table and translate the LBA into the PBA. Examples of an address mapping method performed through the FTL may include various methods according to a mapping unit. Representative address mapping methods include a page mapping method, a block mapping method, and a hybrid mapping method.

The processor 1010 may randomize data received from the host. For example, the processor 1010 may use a randomizing seed to randomize data received from the host. The randomized data may be provided, as data to be stored, to the memory device and may be programmed in the memory cell array.

The processor 1010 may derandomize data received from the memory device during a read operation. For example, the processor 1010 may derandomize the data received from the memory device using a derandomizing seed. The derandomized data may be output to the host.

In an embodiment, the processor 1010 may run software or firmware to perform randomizing and derandomizing operations.

The memory buffer 1020 may be used as a working memory, a cache memory, or a buffer memory of the processor 1010. The memory buffer 1020 may store codes and commands executed by the processor 1010. The memory buffer 1020 may store data that is processed by the processor 1010. The memory buffer 1020 may include a static RAM (SRAM) or a dynamic RAM (DRAM).

The ECC unit 1030 may perform error correction. The ECC unit 1030 may perform error correction code (ECC) encoding based on data to be written to the memory device through the memory interface 1060. The ECC-encoded data may be transferred to the memory device through the memory interface 1060. The ECC unit 1030 may perform ECC decoding based on data received from the memory device through the memory interface 1060. In an example, the ECC unit 1030 may be included as the component of the memory interface 1060 in the memory interface 1060.

The host interface 1040 may communicate with the external host under the control of the processor 1010. The host interface 1040 may perform communication using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The buffer control circuit 1050 may control the memory buffer 1020 under the control of the processor 1010.

The memory interface 1060 may communicate with the memory device under the control of the processor 1010. The memory interface 1060 may transmit/receive commands, addresses, and data to/from the memory device through channels.

In an embodiment, the memory controller 1000 may not include the memory buffer 1020 and the buffer control circuit 1050. These components may be provided separately or their functions distributed to other components within the memory controller 1000.

In an embodiment, the processor 1010 may control the operation of the memory controller 1000 using codes. The processor 1010 may load codes from a nonvolatile memory device (e.g., ROM) provided in the memory controller 1000. In an embodiment, the processor 1010 may load codes from the memory device through the memory interface 1060.

In an embodiment, the bus 1070 of the memory controller 1000 may be divided into a control bus and a data bus. The data bus may be configured to transmit data in the memory controller 1000, and the control bus may be configured to transmit control information such as commands or addresses in the memory controller 1000. The data bus and the control bus may be isolated from each other, and may neither interfere with each other nor influence each other. The data bus may be coupled to the host interface 1040, the buffer control circuit 1050, the ECC unit 1030, and the memory interface 1060. The control bus may be coupled to the host interface 1040, the processor 1010, the buffer control circuit 1050, the memory buffer 1020, and the memory interface 1060.

Figure 24:
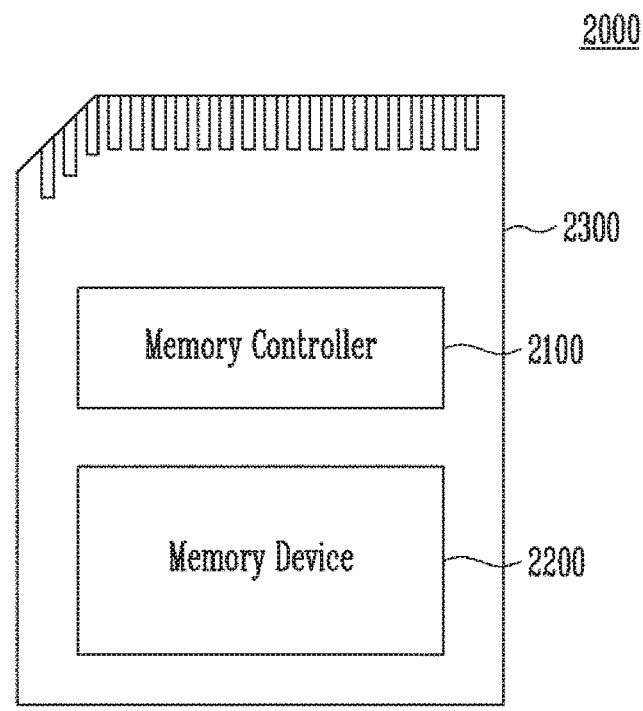
FIG. 24 is a block diagram illustrating a memory card system to which a storage device is applied according to an embodiment of the present disclosure.

FIG. 24 is a block diagram illustrating a memory card system to which the storage device is applied according to an embodiment of the present disclosure.

Referring to FIG. 24, a memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may be control read, write, erase, and background operations of the memory device 2200. The memory controller 2100 may provide an interface between the memory device 2200 and a host. The memory controller 2100 may run firmware for controlling the memory device 2200. The memory device 2200 may be implemented in the same way as the memory device 100 described above with reference to FIG. 16.

In an embodiment, the memory controller 2100 may include components, such as a RAM, a processing unit, a host interface, a memory interface, and an ECC component.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), a Spin-Torque Magnetic RAM (STT-M RAM).

The memory controller 2100 and the memory device 2200 may be integrated into a single semiconductor device to configure a memory card. For example, the memory controller 2100 and the memory device 2200 may be integrated into a single semiconductor device to configure a memory card such as a PC card (personal computer memory card international association: PCMCIA), a compact flash (CF) card, a smart media card (SM or SMC), a memory stick, a multimedia card (MMC, RS-MMC, MMCmicro or eMMC), a SD card (SD, miniSD, microSD, or SDHC), or a universal flash storage (UFS).

Figure 25:
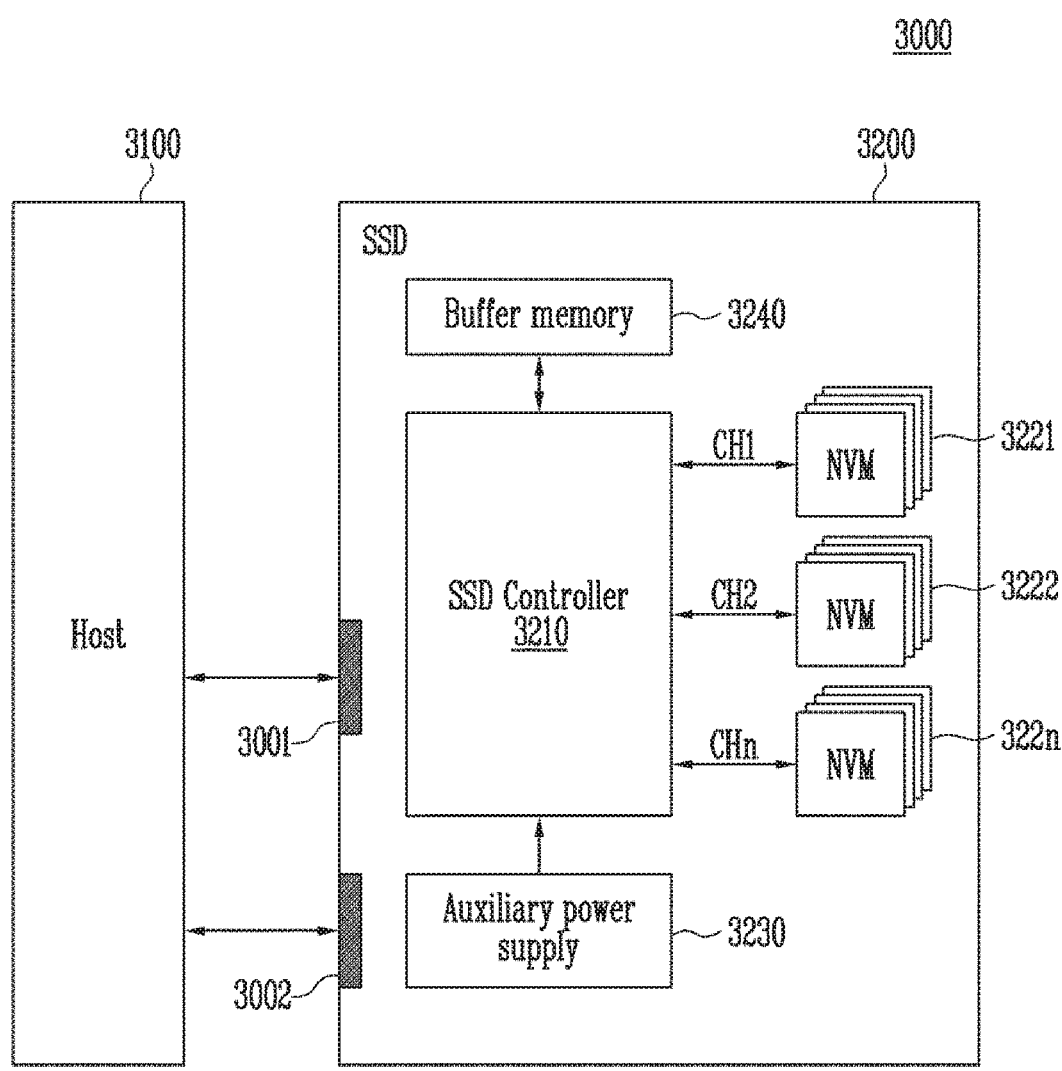
FIG. 25 is a block diagram illustrating an example of a solid state drive (SSD) system to which the storage device is applied according to an embodiment of the present disclosure.

FIG. 25 is a block diagram illustrating an example of a solid state drive (SSD) system to which the storage device is applied according to an embodiment of the present disclosure.

Referring to FIG. 25, an SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322n, an auxiliary power supply 3230, and a buffer memory 3240.

In an embodiment, the SSD controller 3210 may perform the function of the memory controller 200 described above with reference to FIG. 1.

The SSD controller 3210 may control the plurality of flash memories 3221 to 322n in response to the signals SIG received from the host 3100. In an embodiment, the signals SIG may be based on the interfaces of the host 3100 and the SSD 3200. For example, the signals SIG may be defined by at least one of various interfaces such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100 and may be charged. The auxiliary power supply 3230 may supply the power of the SSD 3200 when the supply of power from the host 3100 is not smoothly performed. In an embodiment, the auxiliary power supply 3230 may be disposed within or externally to the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322n or may temporarily store metadata (e.g., mapping tables) of the flash memories 3221 to 322n. The buffer memory 3240 may include volatile memories such as DRAM, SDRAM, DDR SDRAM, LPDDR SDRAM, and GRAM or nonvolatile memories such as FRAM, ReRAM, STT-MRAM, and PRAM.

Figure 26:
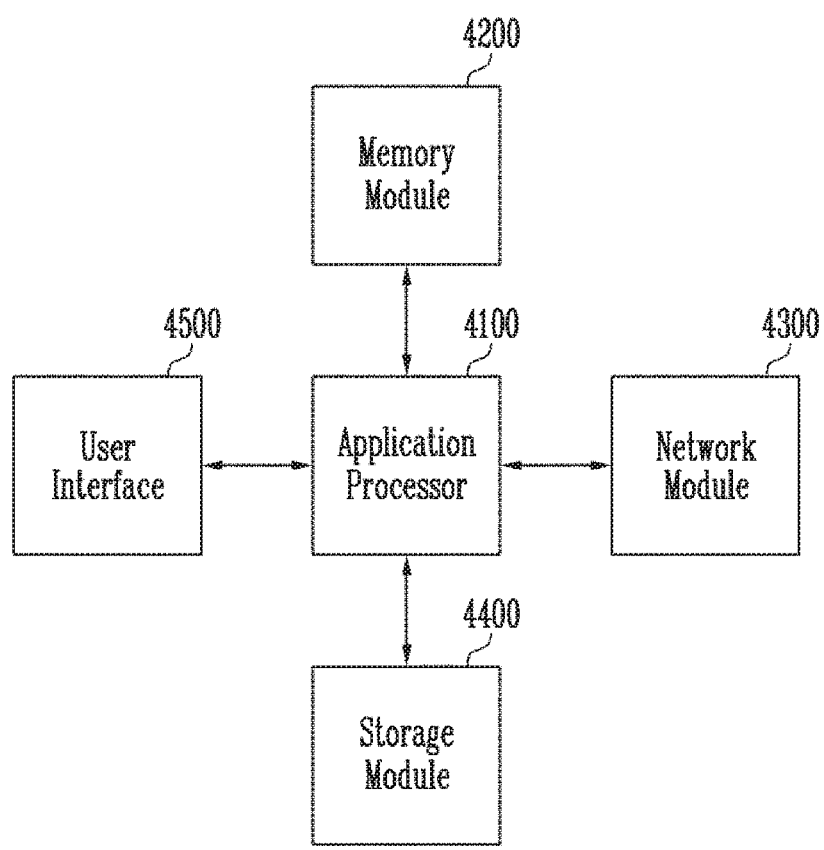
FIG. 26 is a block diagram illustrating a user system to which the storage device is applied according to an embodiment of the present disclosure.

FIG. 26 is a block diagram illustrating a user system to which the storage device is applied according to an embodiment of the present disclosure.

Referring to FIG. 26, a user system 4000 may include an application processor 4100, a memory module 4200, a network module 4300, a storage module 4400, and a user interface 4500.

The application processor 4100 may run components included in the user system 4000, an Operating System (OS) or a user program. In an embodiment, the application processor 4100 may include controllers, interfaces, graphic engines, and the like for controlling the components included in the user system 4000. The application processor 4100 may be provided as a system-on-chip (SoC).

The memory module 4200 may function as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDRAM, LPDDR2 SDRAM, and LPDDR3 SDRAM, or nonvolatile RAMs such as PRAM, ReRAM, MRAM, and FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), WiMAX, WLAN, UWB, Bluetooth, or Wi-Fi communication. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, each of which may be operated in the same way as the memory device described above with reference to FIG. 16. The storage module 4400 may be operated in the same way as the storage device 50 described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, there are provided a memory controller that evenly or equally assigns or distributes logical block addresses and a method of operating the memory controller.

While various embodiments of the present disclosure have been disclosed, those skilled in the art will appreciate in light of the present disclosure that various modifications, additions and substitutions are possible without departing from the scope and spirit of the present invention. Therefore, the scope of the present invention is defined by the appended claims and equivalents thereof rather than by the description preceding them.

In the above-discussed embodiments, steps may be selectively performed or skipped. In addition, certain steps may not always be sequentially performed in the stated order, and may be performed a different order. Furthermore, the embodiments disclosed herein aim to help those with ordinary knowledge in this art more clearly understand the present invention rather than aiming to limit the bounds of the present invention. In other words, one of ordinary skill in the art to which the present invention pertains will be able to easily understand that various modifications are possible based on the technical scope of the present disclosure.

Embodiments of the present invention have been described with reference to the accompanying drawings, and specific terms or words used in the description should be construed in accordance with the spirit of the present invention without limiting the subject matter thereof. It should be understood that many variations and modifications of the basic inventive concept described herein will still fall within the spirit and scope of the present invention as defined in the appended claims and their equivalents.

What is claimed is:

1. A memory controller for controlling a plurality of memory devices in which data is stored, the memory controller comprising:
    a host interface configured to receive a request and a logical address corresponding to the request from a host;
    a processor including multiple cores, each configured to receive the logical address from the host interface and generate mapping information indicating a mapping relationship between the logical address and a physical address; and
    a bitmap storage configured to store a bitmap indicating at least one logical address, received before receiving the request and the logical address corresponding to the request, assigned to each of the multiple cores,
    wherein when the host interface assigns the logical address, the host interface assigns the logical address to one of the multiple cores until a preset rate is satisfied based on the bitmap.

2. The memory controller according to claim 1, wherein the bitmap has a bit value indicating a core of the multiple cores in which the logical address is assigned.

3. The memory controller according to claim 2, wherein the bitmap storage is configured to set the bit value to correspond to any one of the multiple cores depending on a number of multiple cores.

4. The memory controller according to claim 1, wherein the host interface is configured to determine, based on the bitmap, how many logical addresses are assigned to each of the multiple cores.

5. The memory controller according to claim 4, wherein the host interface is configured to assign the logical address received from the host to any one of the multiple cores based on an assignment ratio and a number of logical addresses respectively assigned to the multiple cores.

6. The memory controller according to claim 5, wherein the host interface is configured to determine the assignment ratio based on a number of memory devices coupled to each of the multiple cores, among the plurality of memory devices.

7. The memory controller according to claim 5, wherein the host interface is configured to assign the logical address to a core to which a smallest number of logical addresses have been assigned, among the multiple cores.

8. The memory controller according to claim 7, wherein the host interface is configured to, when a ratio of logical addresses assigned to the multiple cores is equal to the assignment ratio, assign the logical address to a starting core among the multiple cores.

9. The memory controller according to claim 1, wherein the host interface is configured to, when the core to which the logical address is to be assigned is determined among the multiple cores, output core information about the core to which the logical address is to be assigned to the bitmap storage.

10. The memory controller according to claim 9, wherein the bitmap storage is configured to change a bit value corresponding to the logical address to a value indicating the core to which the logical address is assigned based on the core information.

11. The memory controller according to claim 1, wherein the host interface is configured to receive logical addresses respectively corresponding to physical addresses of a memory block on which garbage collection is to be performed.

12. The memory controller according to claim 11, wherein the host interface is configured to assign logical addresses, respectively corresponding to the physical addresses of the memory block on which the garbage collection is to be performed, to the multiple cores based on the numbers of logical addresses respectively assigned to the multiple cores.

13. A method of operating a memory controller including multiple cores for controlling a plurality of memory devices in which data is stored, the method comprising:
    determining a victim memory block on which garbage collection is to be performed, among a plurality of memory blocks included in the plurality of memory devices;
    referring to a bitmap indicating at least one logical address, received before receiving a request and a logical address corresponding to the request, assigned to each of the multiple cores; and
    assigning logical addresses respectively corresponding to physical addresses of the victim memory block among the multiple cores based on the bitmap according to a preset rate.

14. The method according to claim 13, wherein the logical addresses respectively corresponding to the physical addresses of the victim memory block are assigned to the cores based on a number of logical addresses respectively assigned to the multiple cores.

15. A controller comprising:
    plural cores each configured to control a corresponding memory device group to perform an operation based on one or more logical addresses assigned thereto;
    a storage configured to store assignment status information indicating a number of logical addresses, received before receiving the one or more logical addresses, assigned to the respective cores; and
    an assignment device configured to control assignment of the one or more logical addresses to the respective cores for converging on an assignment ratio by sequentially assigning logical addresses to the cores based on the assignment status information.

16. The controller of claim 15, wherein the assignment ratio depends on capacities of memory device groups respectively corresponding to the cores.

17. The controller of claim 15, wherein the assignment status information is updated each time the assignment device assigns a logical address to one of the cores.

* * * * *